US012808702B2

(12) United States Patent
Onikoyi et al.

(10) Patent No.: US 12,808,702 B2
(45) Date of Patent: Nov. 24, 2026

(54) METHOD AND APPARATUS FOR DRONE CONVEYED SINGLE PHASE ULTRASONIC FLOWMETER

(71) Applicant: SAUDI ARABIAN OIL COMPANY, Dhahran (SA)

(72) Inventors: Abiola S. Onikoyi, Khurais (SA); Anas Z. Abu Khudair, Khobar (SA); Fahad O. Al-Rwethy, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 427 days.

(21) Appl. No.: 18/415,059

(22) Filed: Jan. 17, 2024

(65) Prior Publication Data

US 2025/0231056 A1 Jul. 17, 2025

(51) Int. Cl.

| | |
|---|---|
| ***G06F 11/30*** | (2006.01) |
| ***B64U 70/99*** | (2023.01) |
| ***G01F 1/667*** | (2022.01) |
| *B64U 101/26* | (2023.01) |

(52) U.S. Cl.

CPC ............. *G01F 1/667* (2013.01); *B64U 70/99* (2023.01); *B64U 2101/26* (2023.01); *B64U 2201/10* (2023.01)

(58) Field of Classification Search

CPC ........................................................ G01F 1/667

See application file for complete search history.

(56) References Cited

U.S. PATENT DOCUMENTS

| | | | | |
|---|---|---|---|---|
| 2019/0145763 | A1 * | 5/2019 | Al-Jabr | G01B 17/02 73/632 |
| 2019/0204814 | A1 * | 7/2019 | Birchbauer | G05B 19/41875 |
| 2020/0174478 | A1 * | 6/2020 | Abdellatif | B60B 19/006 |
| 2023/0146259 | A1 * | 5/2023 | Liktor | G06T 3/4046 382/299 |
| 2025/0044180 | A1 * | 2/2025 | Breaux | G01K 13/02 |

FOREIGN PATENT DOCUMENTS

| | | | | |
|---|---|---|---|---|
| CN | 219955072 U | * | 11/2023 | |
| CN | 117606573 A | * | 2/2024 | G01F 1/667 |
| EP | 062024 | * | 6/2024 | B07C 5/00 |

* cited by examiner

*Primary Examiner* — Phuong Huynh

(74) *Attorney, Agent, or Firm* — Osha Bergman Watanabe & Burton LLP

(57) ABSTRACT

A system computes a fluid flow rate of a fluid flowing through a pipe. The system includes a docking station, attached to a portion of the pipe, the portion of the pipe exposed to an air space. The system further includes a drone, that includes a connecting device configured to latch securely onto the docking station, a first ultrasonic transducer that connects to the pipe when the connecting device is latched, a second ultrasonic transducer that connects to the pipe when the connecting device is latched, and a computer configured to perform a computational procedure. The computational procedure includes instructing the first ultrasonic transducer to emit a source signal into the fluid and receiving a propagated signal from the second ultrasonic transducer. The computational procedure further includes computing the fluid flow rate, using a computational model, based on the propagated signal.

20 Claims, 14 Drawing Sheets

METHOD AND APPARATUS FOR DRONE CONVEYED SINGLE PHASE ULTRASONIC FLOWMETER

BACKGROUND

Monitoring the flow rate of a fluid through pipelines is generally a resource intensive task, due to the number of pipelines involved, their size, and the fact that resources must be sent on site. The fluid flow rate is usually measured by sensors that have to be installed in the pipeline and maintained. The results of the measurements must be collected or communicated from the sensors, creating an additional challenge.

Accordingly, there is a need for a more flexible way of obtaining a fluid flow rate through pipelines. A possible solution consists of sending an intelligent drone that may fly autonomously and land on a pipeline. Equipped with measurement and computational tools, the drone determines the fluid flow rate, and, after sending the result to a base station using an internal communication system, the aircraft is ready for its next task.

With this strategy, only minimal installation is required on-site. Devices on which the drone may land can be conveniently installed on the exterior face of the pipeline, and easily removable. Any maintenance needs are shifted to the drone and its internal equipment, which is done at a centralized maintenance site.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments disclosed herein generally relate to a system for computing a fluid flow rate of a fluid flowing through a pipe. The system includes a docking station, attached to a portion of the pipe, the portion of the pipe exposed to an air space. The system further includes a drone capable of flying through the air space. The drone includes a connecting device configured to latch securely onto the docking station, a first ultrasonic transducer that connects to the pipe when the connecting device is latched, a second ultrasonic transducer that connects to the pipe when the connecting device is latched, and a computer configured to perform a computational procedure. The computational procedure includes instructing the first ultrasonic transducer to emit a source signal into the fluid and receiving, after the first ultrasonic transducer starts emitting the source signal, a propagated signal from the second ultrasonic transducer. The computational procedure further includes computing the fluid flow rate, using a computational model, based on the propagated signal.

Embodiments disclosed herein generally relate to a method for computing a fluid flow rate of a fluid flowing through a pipe. The method includes flying a drone through an air space, to a vicinity of a docking station attached to a portion of the pipe, the portion of the pipe exposed to the air space. The drone includes a connecting device, a first ultrasonic transducer, and a second ultrasonic transducer. The method further includes latching the connecting device securely onto the docking station, connecting the first ultrasonic transducer to the pipe using the connecting device, connecting the second ultrasonic transducer to the pipe using the connecting device, emitting a source signal into the fluid using the first ultrasonic transducer and receiving, after the first ultrasonic transducer starts emitting the source signal, a propagated signal from the second ultrasonic transducer. The method further includes computing the fluid flow rate, using a computational model, based on the propagated signal.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1A:
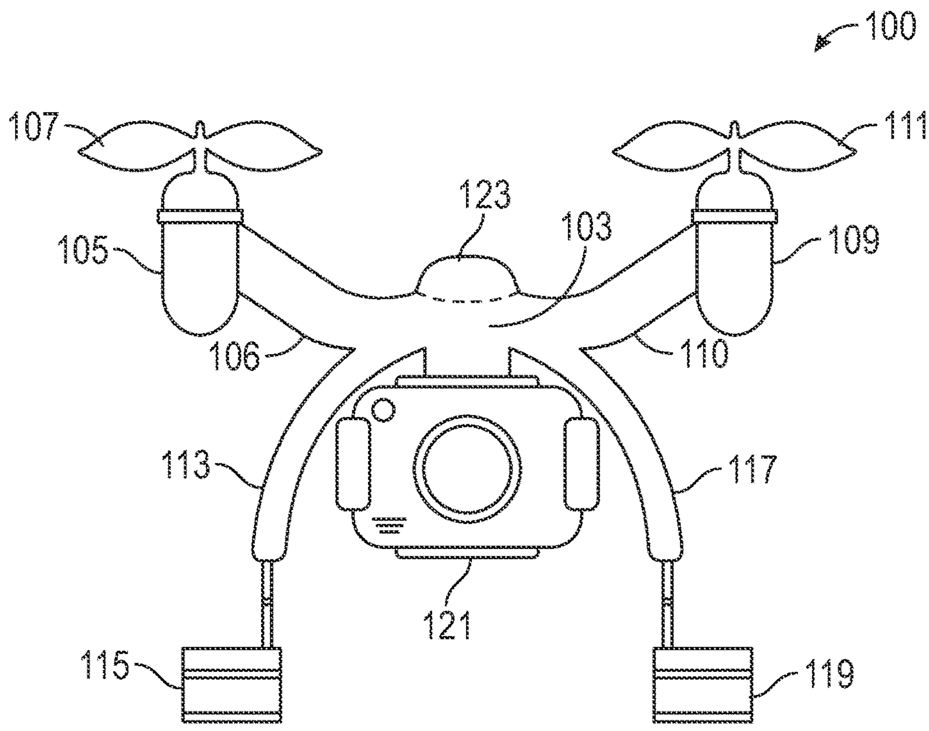
FIG. 1A depicts a front view of a drone, in accordance with one or more embodiments disclosed herein.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. For example, a computer may reference two or more such computers.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

Terms such as "approximately," "about," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. For example, these terms may mean that there can be a variance in value of up to +10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

It is to be understood that one or more of the steps shown in a flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1A-11, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

One or more embodiments disclosed herein provide a drone that can be flown to a pipe, such as a pipeline, to assess a fluid flow rate of a fluid flowing through the pipe. In addition, one or more embodiments describe how the drone receives instruction from and sends results to command system, configured to analyze and optimize the fluid flow rate.

FIGS. 1A-1D depict an example of a drone (100), in accordance with one or more embodiments. FIG. 1A depicts a front view the drone (100). In general, drones may be configured in a myriad of ways. Therefore, the drone (100) is used for illustrative purposes and is not intended to be limiting with respect to a particular configuration. The drone (100) includes a frame (103). The drone (100) is depicted as having four motors which use propellers for lift and thrust. Those skilled in the art will readily appreciate that the drone may include any numbers of propellers and use any other known method for producing lift and thrust, depending on the environment in which the drone is used. As a front view of the drone (100), FIG. 1A shows a first propeller (107), driven by a first motor (105), attached to a distal end of a first motor support (106), that extends from the frame (103). FIG. 1A further shows a second propeller (111), driven by a second motor (109), attached to a distal end of a second motor support (110), that extends from the frame (103). The first motor support (106) and the second motor support (110) are symmetrical with respect to a first axis that passes through a center of mass of the front view of the drone (100) in FIG. 1A.

The drone (100) is equipped with a connecting device configured to latch securely onto a docking station. In the specific example of the drone (100), the connecting device includes two connectors. A first connector (115) is held at a distal end of a first arm (113), that extends from the frame (103). A second connector (119) is held at a distal end of a second arm (117), that extends from the frame (103). The first arm (113) and the second arm (117) are symmetrical with respect to the first axis. The drone (100) further includes a first ultrasonic transducer and a second ultrasonic transducer, not shown in FIG. 1A. In one or more embodiments, the first ultrasonic transducer is installed in the first connector (115) and the second ultrasonic transducer is installed in the second connector (119).

The drone (100) further includes a camera (121). The camera (121) may capture still images, video, or any combination thereof. Further, the camera (121) may also take the form of other types of imaging sensors such as infrared, acoustic, and other applicable sensors useful for navigation. Moreover, the camera (121) may take the form of one or more proximity sensors to, for example, align the drone with a docking station.

Figure 1B:
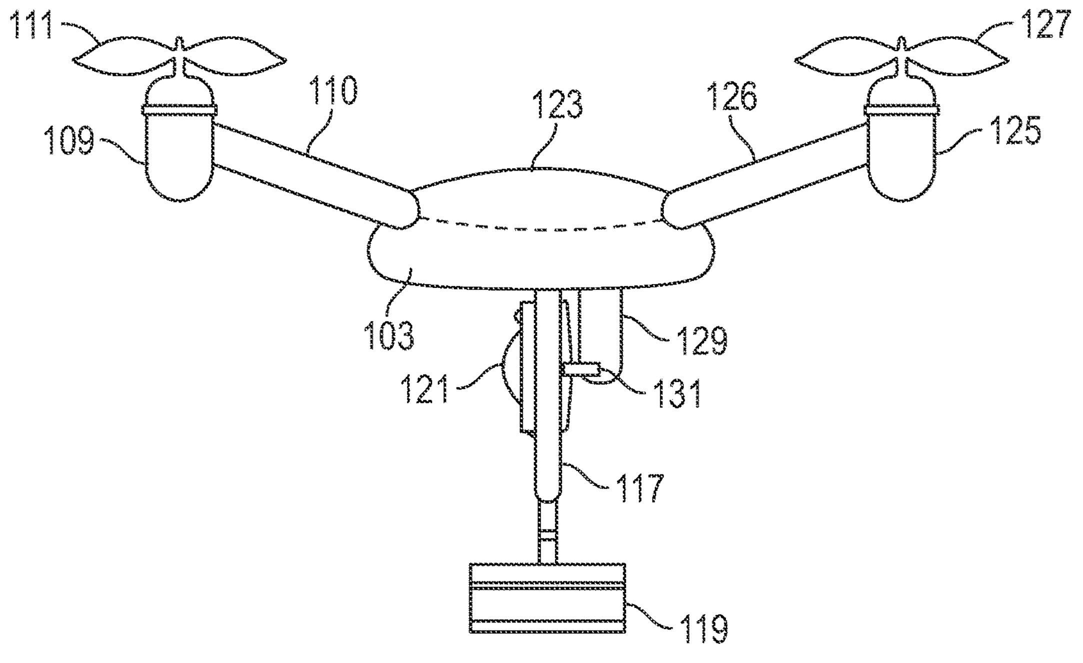
FIG. 1B depicts a side view of a drone, in accordance with one or more embodiments disclosed herein.

FIG. 1B depicts a side view of the drone (100) and shows a third propeller (127), driven by a third motor (125), attached to a distal end of a third motor support (126), that extends from the frame (103). The second motor support (110) and the third motor support (126) are symmetrical with respect to a second axis that passes through a center of mass of the side view of drone (100) in FIG. 1B. In this specific embodiment of the drone (100), the camera (121) is supported by a camera support (129) through a camera link (131), that allow the camera (121) to pivot and capture information from different incident angles. Those skilled in the art will readily appreciate that the camera may be supported by other means without departing from the scope of this disclosure.

Figure 1C:
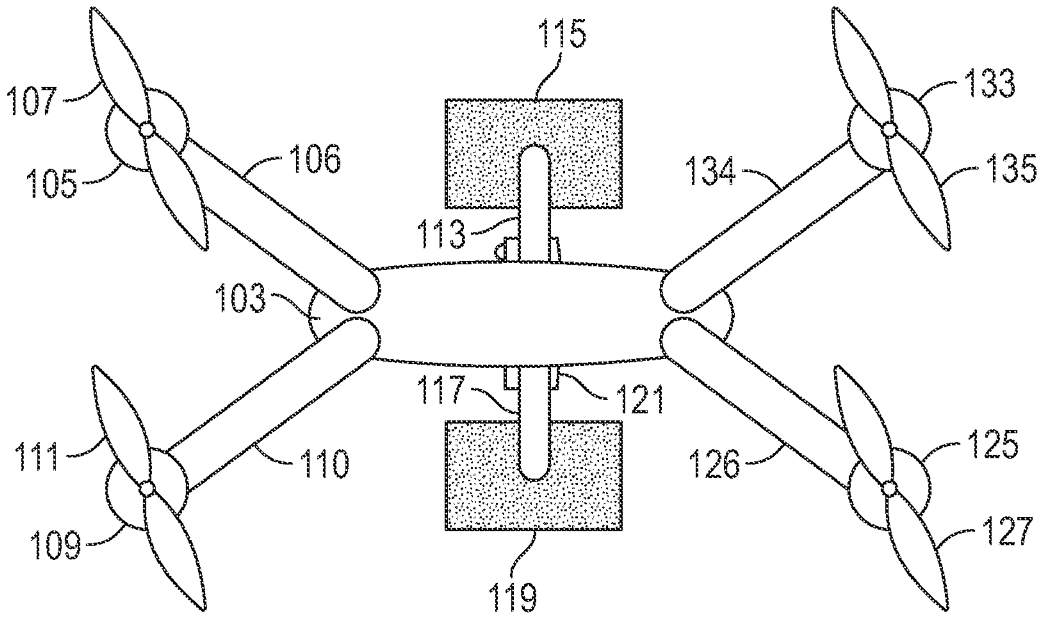
FIG. 1C depicts top view of a drone, in accordance with one or more embodiments disclosed herein.
Figure 1D:
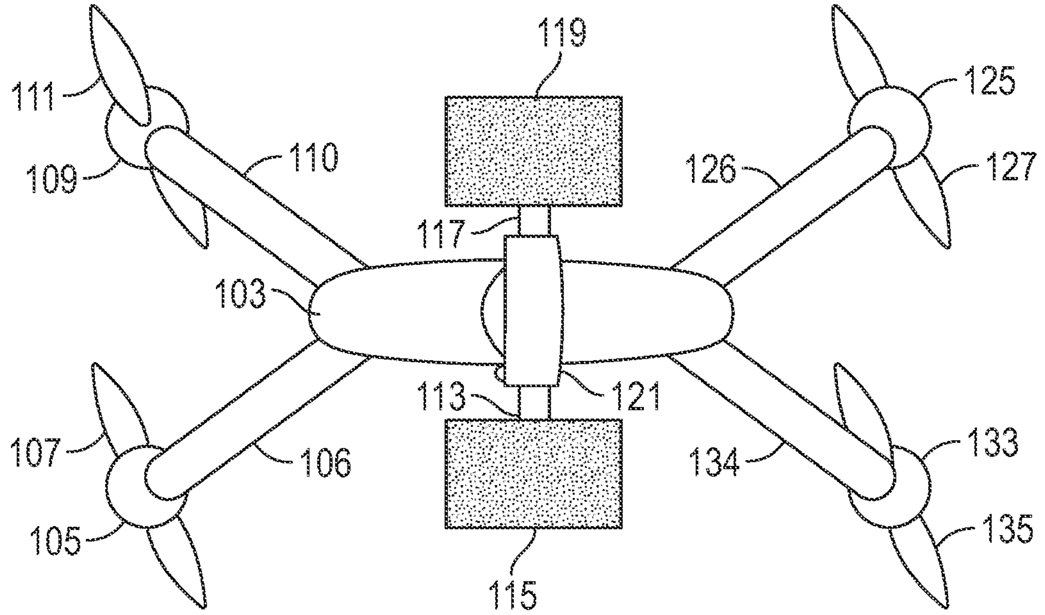
FIG. 1D depicts a bottom view of a drone, in accordance with one or more embodiments disclosed herein.

FIG. 1C depicts a top view of the drone (100) and shows a fourth propeller (135), driven by a fourth motor (133), attached to a distal end of a fourth motor support (134), that extends from the frame (103). The first motor support (106), second motor support (110), third motor support (126) and fourth motor support (134) are symmetrical with respect to a center of mass the projection top view of the drone (100) in FIG. 1C. The first arm (113) and the second arm (117) are also symmetrical to the center of mass the projection top view of the drone (100) in FIG. 1C. When rotated, the propellers (107), (111), (127) and (135) may provide lift and thrust to the drone (100). In one or more embodiments, a battery, not seen in FIGS. 1A-1D, provides electrical power to the motors (105), (109), (125), (133) and any further electrical system of the drone (100), through electrical connections. FIG. 1D depicts a bottom view of the drone (100).

The components of the drone (100) can be made of many different materials. In one or more embodiments, the frame (103) is made of one or more materials, such as carbon fiber, aluminum, or any combination thereof. In one or more embodiment, the frame (103) is covered, at least in part, by a protective coating in an effort to mitigate wear and tear of the frame from external factors. In one or more embodiment, the propellers (107), (111), (127) and (135) are made of a composite material or a reinforced plastic material, or any combination thereof. Examples of a battery of the drone (100) include a lithium polymer battery and a lithium-ion battery. In one or more embodiments, the first ultrasonic transducer and the second ultrasonic transducer include a piezoelectric material, such as zirconate titanate, quartz, or any combination thereof, that convert mechanical stress into an electrical charge.

Figure 2A:
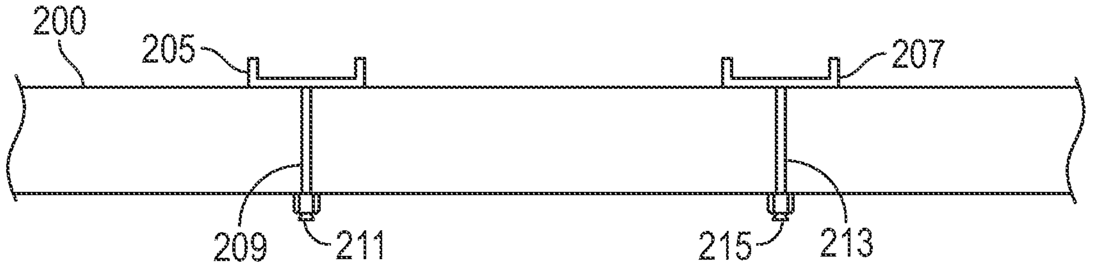
FIG. 2A depicts a front view of a pipe, in accordance with one or more embodiments disclosed herein.
Figure 2B:
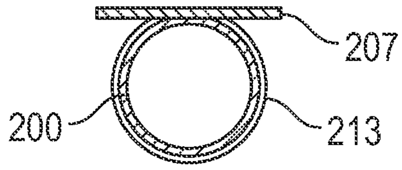
FIG. 2B depicts a cross section of a pipe, in accordance with one or more embodiments disclosed herein.
Figure 2C:
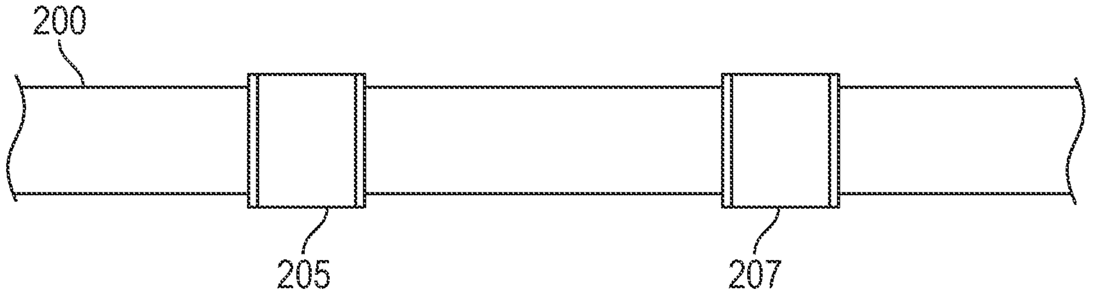
FIG. 2C depicts a top view of a pipe, in accordance with one or more embodiments disclosed herein.

FIG. 2A-2C depict a portion of a pipe (200), in accordance with one or more embodiments. A notable example of the pipe (200) is a pipeline. FIG. 2A depicts a front view of the pipe (200). FIG. 2B depicts a cross section of the pipe (200). FIG. 2C depicts a top view of the pipe (200). The pipe (200) is presented as being cylindrical. However, FIGS. 2A-2C are not intended to be limiting with respect to a particular configuration of the pipe (200). In other embodiments, the pipe (200) may have a shape of any right prism, such as a parallelepiped, or a triangular prism. The pipe (200) conveys a fluid flowing according to a fluid flow rate. In one or more embodiments, the fluid is water, oil, gas, or any multi-phase fluid combining one or more of water, oil and gas. The portion of the pipe (200) is exposed to an air space through which the drone (100) may fly. A docking station, onto which the connecting device of the drone (100) can latch, is installed on the pipe (200). The docking station is exposed to the airspace. In the specific embodiment in FIGS. 2A-2C, the docking station includes a first docking port (205) and a second docking port (207), installed in a way that the first connector (115) of the drone (100) may latch on the first docking port (205) and the second connector (119) of the drone (100) may latch on the second docking port (207). In one or more embodiments, the first docking port (205) and a second docking port (207) are identical. The docking station may be installed on the pipe (200) in many ways. FIGS. 2A-2C show one way in which the docking station may be attached to the pipe (200). The first docking port (205) is attached to the pipe (200) with a first clamp (209) secured with a first fastener (211). The second docking port (207) is attached to the pipe (200) with a second clamp (213) secured with a second fastener (215). The pipe (200) can be of any size, provided that it can host the docking station. In FIGS. 2A-2C, the pipe (200) has a diameter smaller than a length of the docking ports (205) and (207). In other applications of this disclosure, the diameter of the pipe (200) may be larger than the dimensions of the docking ports (205) and (207).

Latching the connecting device onto the docking station may be performed by various latching mechanisms. Examples of latching mechanisms that may be used latch the connecting device onto the docking station include, but are not limited to, a hook, attached to one of the docking station and the connecting device, configured to hook onto the other of the docking station and the connecting device. Examples of latching mechanisms that may be used latch the connecting device onto the docking station further include a pair of mutually attractive magnets, one magnet located in, or on the docking station and the other magnet located in, or on the connecting device. In implementations where the docking station includes a plurality of docking ports and the connecting device includes a plurality of connectors, such as the drone (100) and the pipe (200) described in FIGS. 1A-2C, a latching mechanism, such as the latching mechanisms described above, may be used for latching each connector to each corresponding docking port.

Figure 3A:
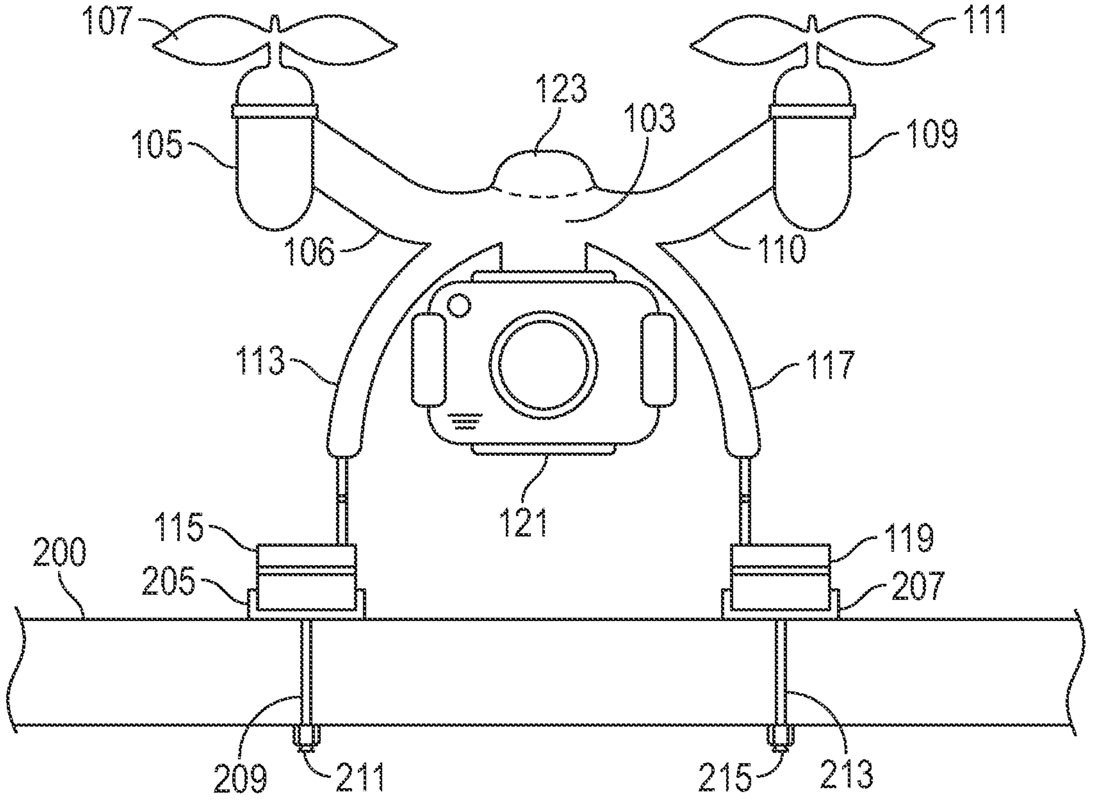
FIG. 3A depicts a front view of a drone landed on a pipe, in accordance with one or more embodiments disclosed herein.
Figure 3B:
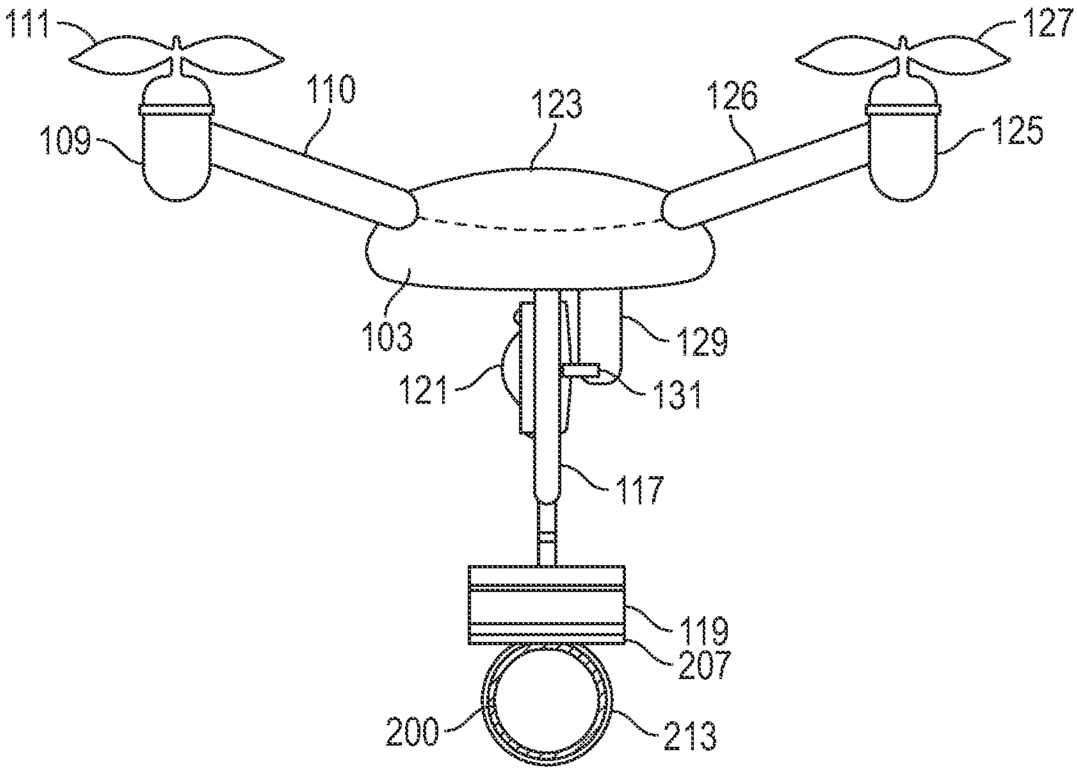
FIG. 3B depicts a side view of a drone landed on a pipe, in accordance with one or more embodiments disclosed herein.
Figure 3C:
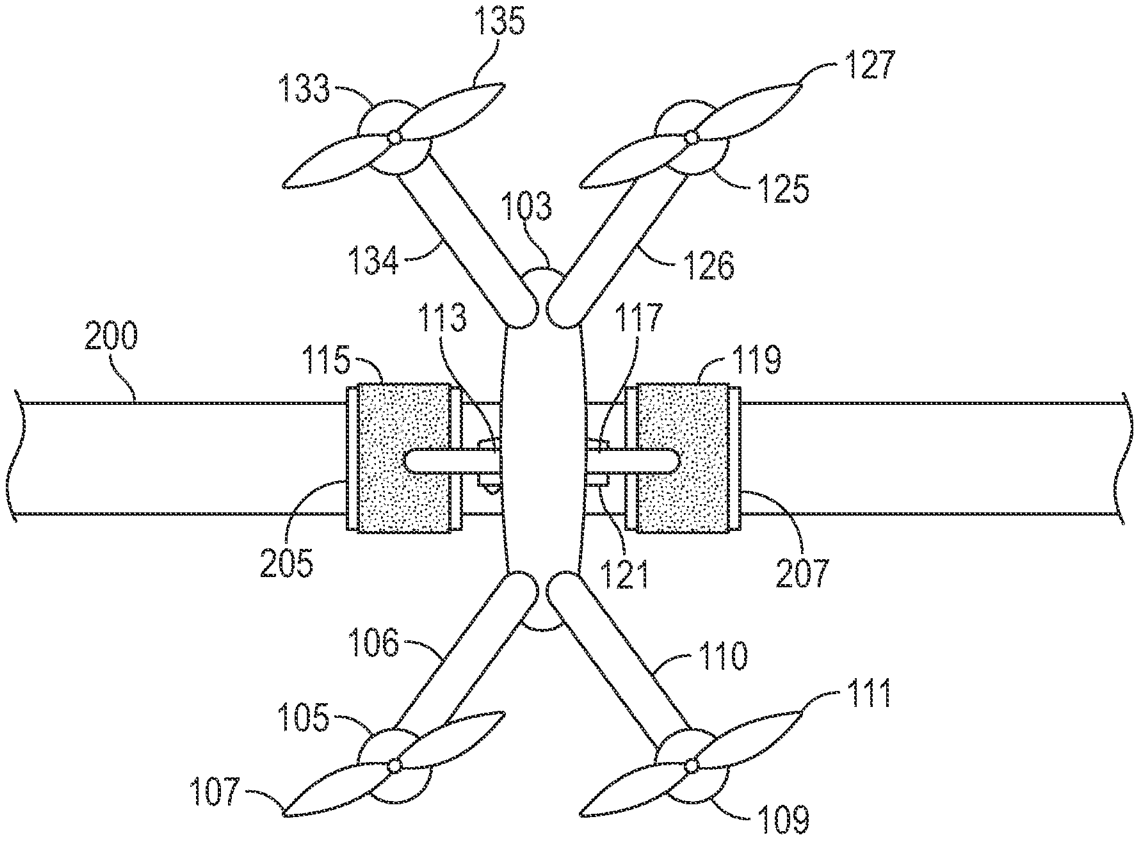
FIG. 3C depicts a top view of a drone landed on a pipe, in accordance with one or more embodiments disclosed herein.

FIGS. 3A-3C depict a system in which the drone (100) lands on the pipe (200). The first connector (115) of the drone (100) securely latches onto the first docking port (205) and the second connector (119) of the drone (100) securely latches onto second docking port (207). The first ultrasonic transducer and the second ultrasonic transducer are installed in the drone (100) in a way that when the connecting device is latched onto the docking station, the first ultrasonic transducer and the second ultrasonic transducer are connected to the pipe (200) and may both emit ultrasonic signal into the fluid and receive ultrasonic signal from the fluid. In the specific example of the drone (100), the connecting device comprises two connectors: the first connector (115) comprises the first transducer and the second connector (119) comprises the second transducer. The first transducer connects to the pipe when the first connector (115) is latched onto the first docking port (205). The second transducer connects to the pipe when the second connector (119) is latched onto the second docking port (207). In other configurations, the connecting device does not comprise two connectors, or the drone (100) has two connectors, but the two connectors do not comprise the transducers. In these configurations, the first ultrasonic transducer and the second ultrasonic transducer are still installed in a way that when the connecting device is latched onto the docking station, the first ultrasonic transducer and the second ultrasonic transducer are connected to the pipe (200) and may both emit ultrasonic signal into the fluid and receive ultrasonic signal from the fluid.

In one or more embodiments, the drone (100) further includes a tank (123) containing sonic transmission fluid. The sonic transmission fluid is designed to facilitate a transmission of ultrasonic signals between the fluid and the transducers. The tank (123) is configured to release sonic transmission fluid into the first ultrasonic transducer and the second ultrasonic transducer through a release mechanism, not shown in FIGS. 1A-1D. In one or more embodiments, the sonic transmission fluid is a coupling gel. The drone (100) further includes a computer, not shown in FIG. 1A. Fluid flow rate computations are performed using the computer, based on ultrasonic signals sent and received by the first ultrasonic transducer and the second ultrasonic transducer. Examples of fluid flow rate computational methods are given in other paragraphs of this disclosure.

In one or more embodiments, the docking station includes a battery charger, configured to charge the battery of the drone (100) when the connecting device is latched onto the docking station. Charging the battery using a charger installed in the docking station can be done in many ways. In some implementations, a first electrical wire connects the battery charger to an exposed part of the docking station and a second electrical wire connects the battery to an exposed part of the connecting device. The first and second electrical wired are installed in a way that upon latching the connecting device onto the docking station, the first electrical wire connects to the second electrical wire. This way, the battery charger charges the battery by circulating electrical current between the battery charger and the battery, through the first and second electrical wires. In other implementations, the battery charger is a magnetic induction charger and charging the battery is done wirelessly when the connecting device is latched onto the docking station. In the specific embodiments of the pipe (200) in FIGS. 2A-2C, a battery charger may be installed in the first docking port (205) or the second docking port (207), or both.

In one or mode embodiments, the drone (100) further includes a global positioning system (GPS), configured to receive a location of the docking station. In some embodiments, the drone (100) further includes a remote-control system that receives command inputs from a pilot, where the pilot may be a human or a machine. In some embodiments, the drone (100) further includes an autonomous flying system. The autonomous system may be of various forms and include a variety of devices. Examples of devices that may be included in the autonomous flight system include sensors, such as pressure sensors, position sensors and movement sensors. The autonomous flight system may further include a sonar, capable of mapping an environment surrounding the drone (100). The autonomous flight system may further include an accelerometer measuring an acceleration of the drone (100), a gyroscope that controls a stability of the drone (100), or an altimeter that measures an altitude of the drone (100). The autonomous flying system may make use of the camera (121) for obstacle detection. The autonomous flying system includes flying software, hosted and run on the computer. The flying software may include a flying control algorithm that sends flying inputs to the mechanical elements of the drone (100), such as the motors (105) and (109). Examples of flying inputs sent to the mechanical elements of the drone (100) may include increasing or reducing the thrust of one or more engines of the drone (100), or changing an orientation of one or more engines of the drone (100). Such flying inputs may have an effect of moving the drone (100) left, right, up or down, or modifying a speed of motion of the drone (100). In one or more embodiments, flying software uses a fly-by-wire system to send the flying inputs. The flying software may further include an obstacle detection algorithm and send a flying input to the mechanical elements of the drone (100) for the drone (100) to avoid an obstacle.

In one or more embodiments, the drone (100) further includes a communication system, that allows the drone (100) to communicate with a remote operator. The communication system may include a radio transmitter or a radio receiver, or both. The operator may also use a radio transmitter or a radio receiver, or both to communicate with the drone (100). Communication may be transmitted in several ways, including via a satellite, a remote network system or a wireless cellular mesh, such as a LTE or a 5G network. Through the communication system, the drone (100) may receive commands, such as a flying command, or send information to the operator. Examples of information that may be sent to an operator include, but are not limited to, a result of a computation performed by the drone, data captured by the camera (121) or data captured by the sensors of the drone (100). In some implementations, the communication system includes a broadband link. In some implementations, the flying software is configured to receive flying commands from the operator. Upon receiving a flying command, the flying algorithm sends flying inputs to the mechanical elements of the drone (100) to execute the flying command. A notable example of a flying command is a command to fly the drone (100) to a vicinity of the destination. Upon receiving a command to fly to a vicinity of the destination, the flying algorithm sends flying inputs to the mechanical elements of the drone (100) to fly the drone to the vicinity of the destination. For the purpose of this disclosure, a vicinity of a location is defined either as an inside of disk, centered at the location, with a pre-defined radius, or a region from which any object located the location is detectable by the camera (121). To execute a flying command, the autonomous flying system may use the GPS as a guide.

In one or more embodiments, the drone (100) includes an artificial intelligence (AI) model configured to detect the docking station from images captured by the camera (121) and determine a docking position. Then, the computer sends a flying command to the autonomous flying system to position the drone (100) to the docking position. A docking position for the drone (100) is a position, in the air space, that satisfies two criteria that allow the connecting device to be latched onto the docking station: firstly, the docking position is sufficiently close to the docking station; secondly, the connecting device of the drone (100) is aligned with the docking station. In the specific embodiment of the drone (100) and the pipe (200), the connecting device includes two connectors, and the docking station includes two docking ports. Aligning the connecting device of the drone (100) to the docking station includes aligning the first connector (115) with the first docking port (205) and aligning the second connector (119) with the second docking port (207). The AI model is hosted and run on the computer. Examples of AI models that may be used to detect the docking station and determining a docking position include a range of computer vision models, such as an image detection algorithm, an image classification algorithm, or both. Examples of algorithms performing image detection, and image classification, or both include region-based convolutional neural networks (RCNN) and "you only look once" (YOLO) algorithms. In some embodiments, the AI model includes an image segmentation algorithm, such as a UNET algorithm or a mask-RCNN algorithm. An image segmentation algorithm assigns a value to each pixel on an image, the value corresponding to an object detected on the image. For example, given an image taken by the camera (121), a segmentation algorithm may be configured to assign a value of one to each pixel that belongs to the docking station and zero to each pixel that does not belong to the docking station. The RCNN, YOLO, UNET and mask-RCNN models are examples of convolutional neural networks. In many instances, the AI model may include a neural network. In some implementations, positioning the drone (100) to a docking position is done in several steps that involve back-and-forth communication between the AI model and the autonomous flying system. For instance, as the drone arrives in a vicinity of the docking station, the following three approximation steps a), b) and c) may be iteratively repeated until the drone (100) is at the docking position: a) the camera (121) captures an image; b) the AI model detects the docking station on the image; c) the AI model send a command to the flying system to move closer to the docking station by a pre-determined step length.

AI models typically involve a training phase and a testing phase, both using previously acquired data. It is noted that supervised machine-learned models require examples of input and associated output (i.e., target) pairs in order to learn a desired functional mapping. In the context where the AI model in this disclosure is an image detection model, the examples may be defined in many ways. For instance, an example input may be a candidate image comprising an image of a docking station. An associated output, or target, may be a box within the candidate image, the box containing the image of the docking station. Another example input may be a candidate image that does not include an image of a docking station. A corresponding output, or target, may be a flag alerting that there is no image of a docking station in the candidate image. In the context where the AI model is a segmentation model, the examples may be defined in many ways. For instance, an example input may be a candidate image. An associated output, or target, may include a first mask of a same size as the candidate image, each pixel of the first mask having a value of zero or one. The first mask may have a value of one if the pixel is detected as being part of an image of a docking station, or a value of zero if the pixel is detected as not being part of an image of a docking station. A associated output, or target, may further include a second mask of a same size as the candidate image, each pixel of the second mask having a value of zero or one. The second mask may have a value of one if the pixel is detected as being part of an image of a given object, such as an object describing an environment of the docking station, such as a pipe, a tree or water. The second mask may have a value of zero if the pixel is detected as not being part of an image of the given object.

Generally, a plurality of examples is needed, forming a dataset of examples. In one or more embodiments, the dataset is split into a training dataset and a testing dataset. The example input and associated output pairs of the training dataset are called training examples. The example input and associated output pairs of the testing dataset are called testing examples. It is common practice to split the dataset in a way that the training dataset contains more examples than the testing dataset. Because data splitting is a common practice when training and testing a machine-learned model, it is not described in detail in this disclosure. One with ordinary skill in the art will recognize that any data splitting technique may be applied to the dataset without departing from the scope of this disclosure. The AI model is trained as a functional mapping that optimally matches the inputs of the training examples to the associated outputs of the training examples. One with ordinary skill in the art will recognize that various computer vision machine learning models exist and have been trained. Thus, in some embodiments, the AI model in this disclosure may benefit from these previously trained machine learning models through transfer learning.

Once trained, the AI model is validated by computing a metric for the testing examples, in accordance with one or more embodiments. Examples of metrics that may be used to validate the AI model include any scoring or comparison function known in the art, including but not limited to: a mean square error (MSE), a root mean square error (RMSE) and a coefficient of determination ($R^2$), defined as:

$$MSE = \frac{1}{n}\sum_{i=1}^{i=n}|\hat{y}_i - y_i|^2, \quad \text{EQ. 1}$$

$$RMSE = \sqrt{\frac{1}{n}\sum_{i=1}^{i=n}|\hat{y}_i - y_i|^2}, \quad \text{EQ. 2}$$

$$R^2 = 1 - \frac{\sum_{i=1}^{i=n}|\hat{y}_i - y_i|^2}{\sum_{i=1}^{i=n}|y_i - \bar{y}|^2}. \quad \text{EQ. 3}$$

In EQ. 1, EQ. 2, and EQ. 3, n denotes the number of testing examples, each training example being defined as an input-output pair, $(x_i, y_i)$, for i=1, . . . , n, in which $x_i$ is the input, $y_i$ is the output associated with $x_i$ $$\bar{y} = \frac{1}{n}\sum_{i=1}^{i=n}y_i,$$

and $\hat{y}_i$ denotes the prediction obtained by inputting $x_i$ into the AI model, for i=1, . . . , n. The notation $|\cdot|$ denotes a norm that can be applied to the object in between. For example, if the outputs are real-valued, the notation $|\cdot|$ may denote an absolute value. If the outputs are vector-valued, the notation $|\cdot|$ may denote an $l_2$ norm.

Figure 4A:
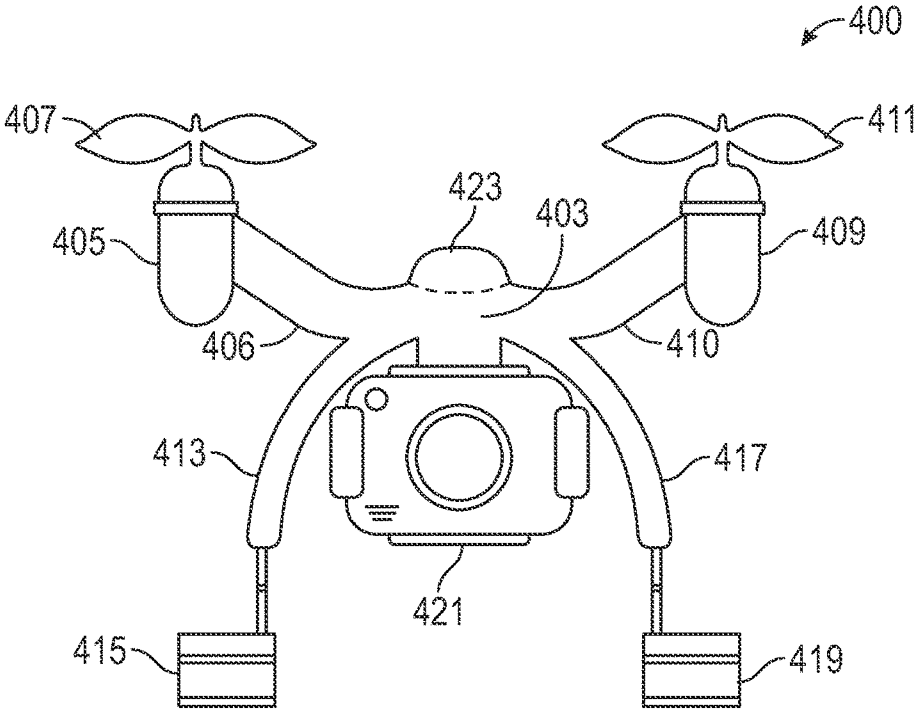
FIG. 4A depicts a front view of a drone, in accordance with one or more embodiments disclosed herein.
Figure 4B:
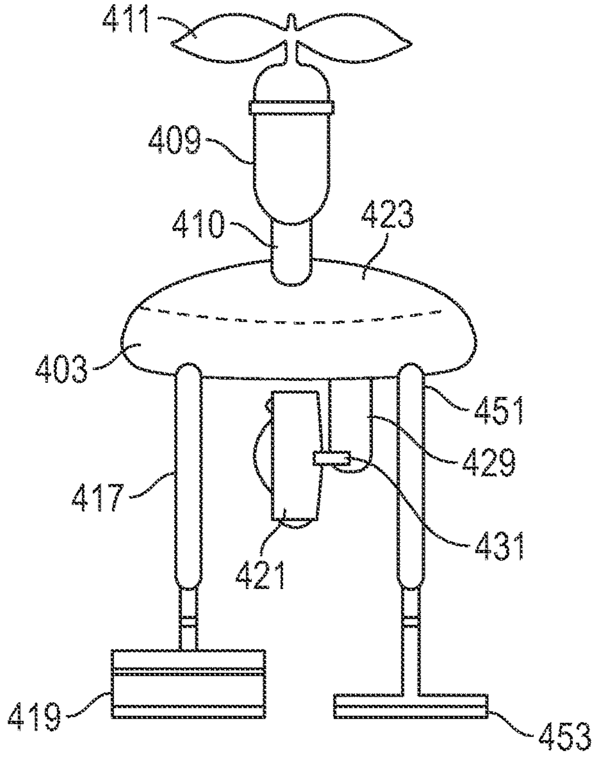
FIG. 4B depicts a side view of a drone, in accordance with one or more embodiments disclosed herein.
Figure 4C:
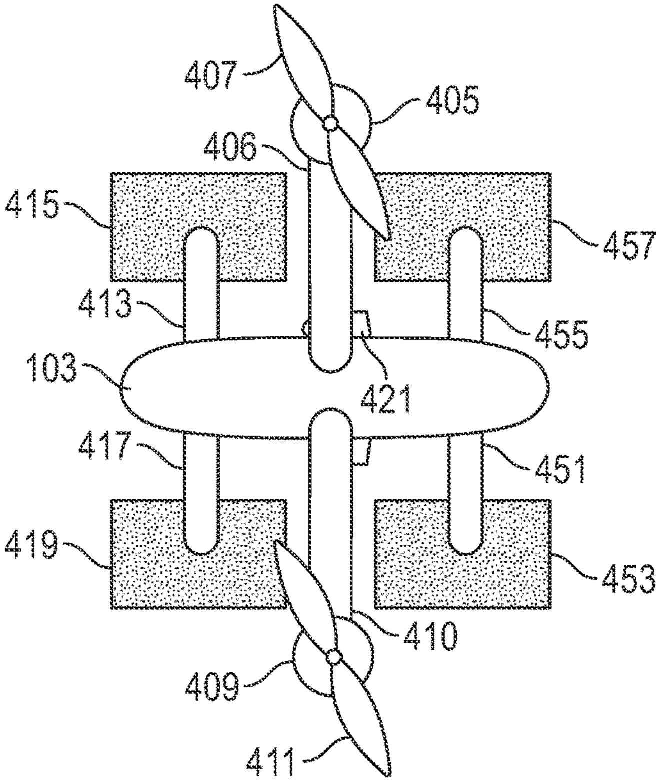
FIG. 4C depicts top view of a drone, in accordance with one or more embodiments disclosed herein.
Figure 4D:
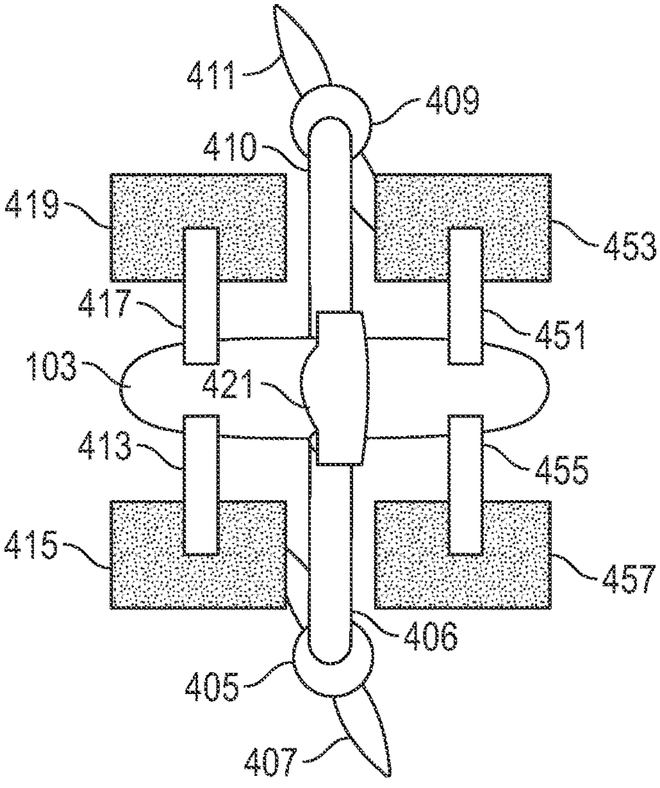
FIG. 4D depicts a bottom view of a drone, in accordance with one or more embodiments disclosed herein.

As previously mentioned, the drone in this disclosure may be structured in many ways. The drone described in FIGS. 1A-1D comprises four motors and two connectors. FIGS. 4A-4D present another embodiment of a drone, denoted as a drone (400), comprising two motors and four connectors. FIG. 4A depicts a front view of the drone (400). FIG. 4B depicts a side view of the drone (400). FIG. 4C depicts a top view of the drone (400). FIG. 4D depicts a bottom view of the drone (400). The drone (400) includes a frame (403), a camera (421) supported by a camera support (429) through a camera link (431). In one or more embodiments, the drone (400) further includes a tank (423) containing sonic transmission fluid. The drone (400) further includes a first propeller (407), driven by a first motor (405), attached to a distal end of a first motor support (406), that extends from the frame (403). The drone (400) further includes a second propeller (411), driven by a second motor (409), attached to a distal end of a second motor support (410), that extends from the frame (403).

The drone (400) is equipped with a connecting device configured to latch securely onto a docking station. In the specific example in FIGS. 4A-4D, the connecting device includes four connectors. A first connector (415) is held at a distal end of a first arm (413), that extends from the frame (403). A second connector (419) is held at a distal end of a second arm (417), that extends from the frame (403). A third connector (453) is held at a distal end of a third arm (451), that extends from the frame (403). A fourth connector (457) is held at a distal end of a fourth arm (455), that extends from the frame (403). In one or more embodiments, two or more of the four connectors are identical. In the specific example in FIGS. 4A-4D, the first connector (415) and the second connector (419) are identical, and the third connector (453) and the fourth connector (457) are identical.

The drone (400) further includes a first ultrasonic transducer and a second ultrasonic transducer, not shown in FIGS. 4A-4D. In one or more embodiments, the first ultrasonic transducer is installed in the first connector (415) and the second ultrasonic transducer is installed in the second connector (419). In other configurations, the first ultrasonic transducer and the second ultrasonic transducer may each be installed in any two distinct connectors among the connectors (415), (419), (453) and (457).

Figure 5A:
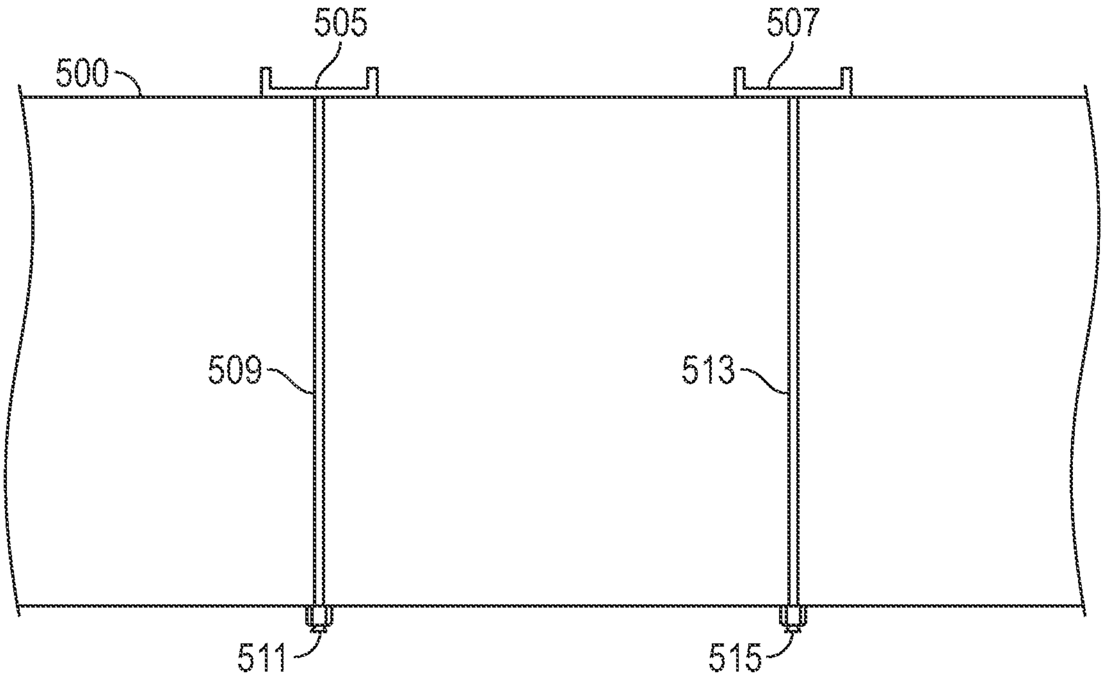
FIG. 5A depicts a front view of a pipe, in accordance with one or more embodiments disclosed herein.
Figure 5B:
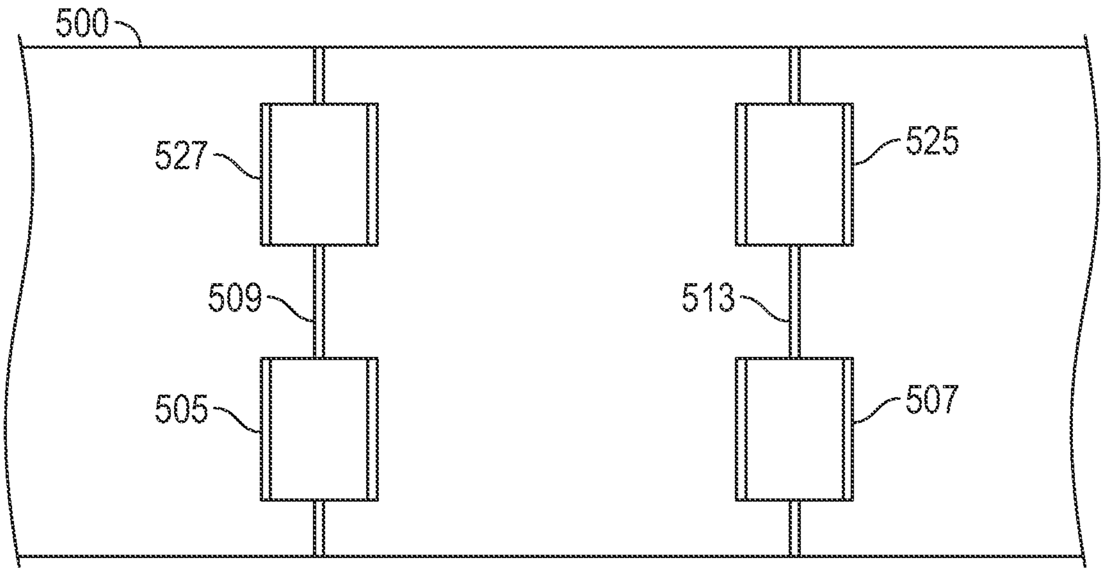
FIG. 5B depicts a top view of a pipe, in accordance with one or more embodiments disclosed herein.

FIGS. 5A and 5B depict a pipe (500), equipped to receive the drone (400). The pipe (500) conveys a fluid flowing according to a fluid flow rate. In one or more embodiments, the fluid is water, oil, or gas, or any multi-phase fluid combination of water, oil and gas. A docking station, onto which the connecting device of the drone (400) can latch, is installed on the pipe (500). In the specific embodiment in FIGS. 5A-5B, the docking station includes four docking ports, namely, a first docking port (505), a second docking port (507), a third docking port (525) and a fourth docking port (527). The four docking ports are installed in a way that the first connector (415) of the drone (400) may latch on the first docking port (505), the second connector (419) of the drone (400) may latch on the second docking port (507), the third connector (453) of the drone (400) may latch on the third docking port (525) and the fourth connector (457) of the drone (400) may latch on the fourth docking port (527). In one or more embodiments, the four docking ports are identical. The docking station may be installed on the pipe (500) in many ways. FIGS. 5A-5B show one way in which the docking station may be attached to the pipe (500). The first docking port (505) and the fourth docking port (527) are attached to the pipe (500) with a first clamp (509) secured with a first fastener (511). The second docking port (507) and the third docking port (525) are attached to the pipe (500) with a second clamp (513) secured with a second fastener (515).

It is emphasized that the example drones (100) and (400) and pipes (200) and (500) are given only as examples and should be considered non-limiting. One with ordinary skill in the art will recognize that other types of drones, pipes, and their accessories may be used without departing from the scope of this disclosure, as long as the drone is able to emit a source sonic signal into the fluid and receive a propagated signal from the fluid.

Figure 6:
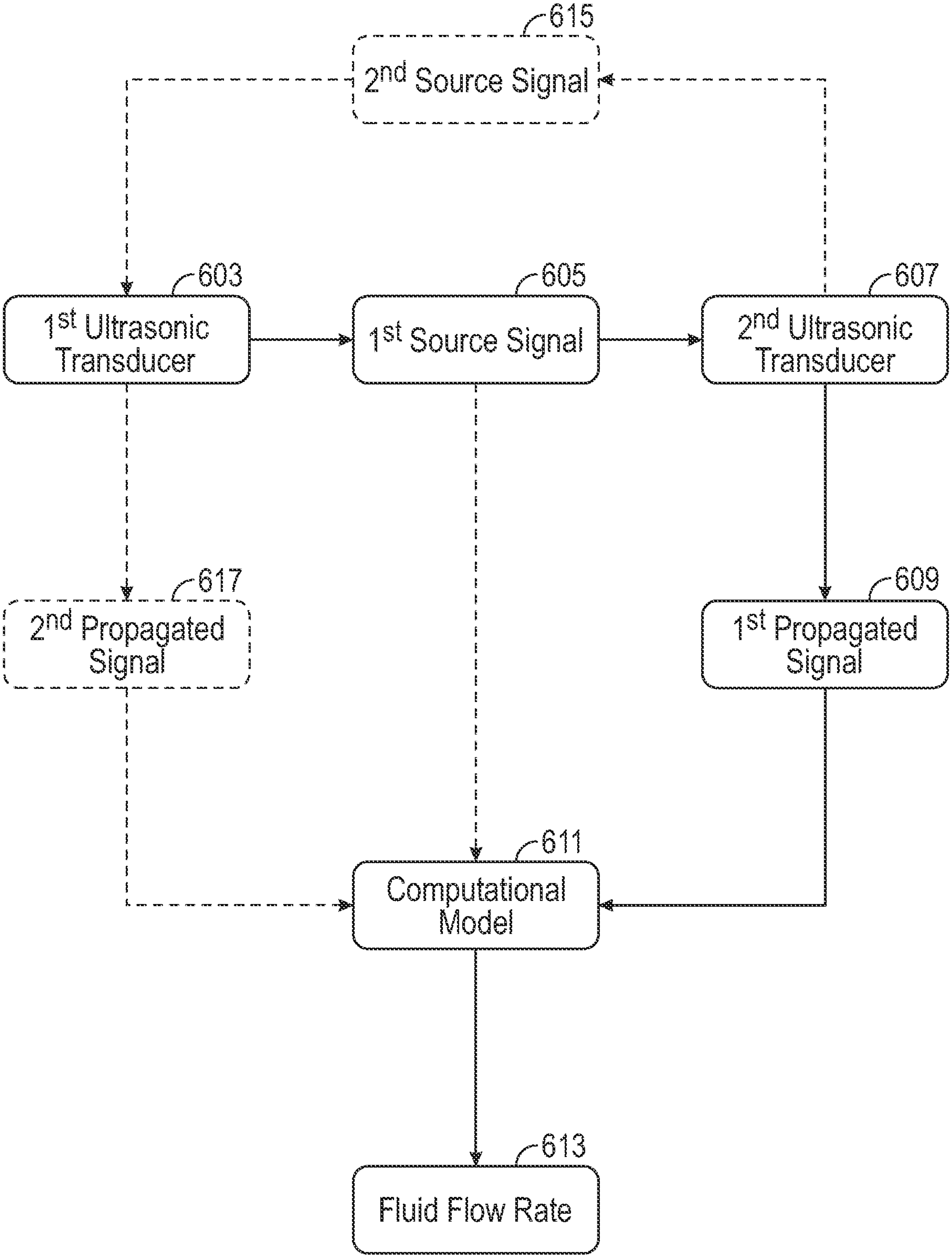
FIG. 6 depicts a system for computing a fluid flow rate, in accordance with one or more embodiments disclosed herein.
Figure 7:
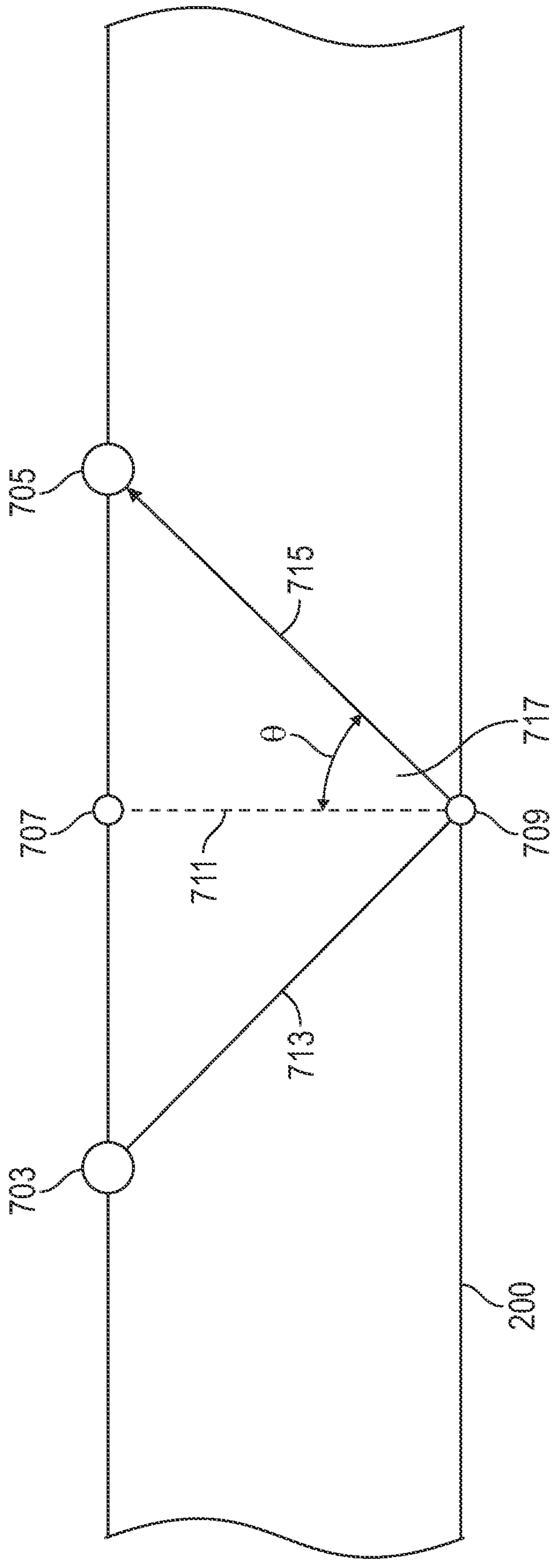
FIG. 7 depicts a ray path, in accordance with one or more embodiments disclosed herein

FIG. 6 depicts a system for computing a fluid flow rate of a fluid flowing through a pipe, by using a drone in accordance with one or more embodiments. For simplicity, the drone (100) and the pipe (200) are used in the description of the system in FIG. 6. Those skilled in the art will readily appreciate that any drone and pipe may used as long as the drone is able to emit a source sonic signal into the fluid and receive a propagated signal from the fluid. In a configuration where the drone (100) is landed on the pipe (200), the connecting device is securely latched onto the docking station installed on the pipe (200). The first ultrasonic transducer (603) included in the drone (100) emits a first source signal (605) into the fluid. Generally, the first source signal (605) is not instantaneous. The first source signal (605) has a duration, denoted as $T_{max}$. The time at which the first ultrasonic transducer (603) starts emitting the first source signal (605) is initialized as 0, such that the first ultrasonic transducer (603) emits the first source signal (605) between 0 and $T_{max}$. The first source signal (605) is characterized by a range of frequencies, called source frequencies, and a range of amplitudes, called source amplitudes. In one or more embodiments, some, or all of the source frequencies of the first source signal (605) are greater than any frequency audible by a human ear, in which case the source frequencies and the first source signal (605) are labeled as ultrasonic. In one or more embodiments, some, or all the source frequencies are above twenty thousand hertz.

The first source signal (605) radiates from the first ultrasonic transducer (603) into the fluid, resulting in a first radiated signal. Some of the first radiated signal is received by the second ultrasonic transducer (607) as a first propagated signal (609). The second ultrasonic transducer (607) starts receiving, at the latest, when the first ultrasonic transducer (603) starts emitting the first source signal (605). The second ultrasonic transducer (607) records for a receiving time $T_{rec}$ that is long enough to receive the full first propagated signal (609). In one or more embodiments, the receiving time $T_{rec}$ is a sum of four durations, $$T_{rec} = T_I + T_{max} + T_{prop} + T_o. \qquad \text{EQ. 4}$$

In EQ. 4, the initial time $T_I$ is a difference from the time at which the first ultrasonic transducer (603) starts emitting the first source signal (605) and the time at which the second ultrasonic transducer (607) starts receiving. The propagation time $T_{prop}$ is an upper bound of a time that it would take for a sonic wave with same frequencies as the source frequencies complete the following path if the fluid within the pipe (200) were stationary: to radiate from the first ultrasonic transducer (603), reflect onto the pipe, opposite the first ultrasonic transducer (603), and travel to the second ultrasonic transducer (607). In one or more embodiments, $T_{prop}$ is computed by a formula, $$T_{prop} = 2\sqrt{\frac{L^2}{4U^2} + \frac{D^2}{U^2}}. \qquad \text{EQ. 5}$$

In EQ. 5, L is a distance between the first ultrasonic transducer (603) and the second ultrasonic transducer (607), D is a diameter of the pipe, and U is an estimate of a lower bound of a speed of sound in the fluid. In some scenarios, a composition of the fluid is known and U is obtained available literature. In other scenarios, U may be defined as a speed of sound in air at a surface of the Earth. In further scenarios, U may be defined as a lowest speed of sound known from any fluid. Coming back to EQ. 4, $T_o$ is a tolerance that accounts for uncertainties in obtaining $T_1$, $T_{max}$ and $T_{prop}$. The tolerance $T_o$ is defined such that the recorded time $T_{rec}$ is long enough, beyond reasonable doubt, to record the entire part of the first radiated signal that arrives at the second ultrasonic transducer (607). In some embodiments, $T_o$ is a multiple of $T_{rec}$. In other embodiments, $T_o$ is a pre-defined number of seconds. Since the first ultrasonic transducer (603) starts emitting the first source signal (605) at time 0, the first propagated signal (609) is received by the second transducer between times $-T_1$ and $T_{max}+T_{prop}+T_o$.

Based on the first propagated signal (609), a fluid flow rate (613) of the fluid flowing through the pipe is computed using a computational model (611) hosted and run on the drone's computer. There are many ways of computing the fluid flow rate (613) based on the first propagated signal (609). In one or more embodiments, the computational model (611) is further based on the first source signal (605).

Examples of a computational model (611) based on the first propagated signal (609) and the first source signal (605) include a Doppler model, defining the fluid flow rate (613) V as:

$$V = \frac{C \cdot (f_0 - f_1)}{2 f_0 \cos(\theta)}. \quad \text{EQ. 6}$$

In EQ. 6, C is a speed of sound in the fluid, $f_0$ is a reference frequency of the first source signal (605), $f_1$ is a reference frequency of the first propagated signal (609), and θ is an angle of incidence of the first propagated signal (609). The parameters $f_0$, $f_1$ and θ in EQ. 6 can be computed in many ways. In some scenarios, the first source signal (605) has only one frequency and the reference frequency $f_0$ is defined as the frequency of the first source signal (605). In other scenarios, the first source signal (605) as multiple frequencies, in which case $f_0$ may be defined as an average frequency of the first source signal (605), or a maximum frequency of the first source signal (605). In one or more embodiments, the first propagated signal (609) includes a first reflected signal, received from a first reflected wave. A ray path of the first reflected wave is defined in FIG. 7. The ray path of the first reflected wave is composed of a sequence of an incident ray path (713) and a reflected ray path (715). The incident ray path (713) is a first segment between a first ultrasonic transducer position (703) and a reflection point (709). The reflected ray path (715) is a second segment between the reflection point (709) and a second ultrasonic transducer position (705). The reflection point (709) is an intersection between a third segment (711) and a side of the pipe opposite the first ultrasonic transducer position (703) and second ultrasonic transducer position (705). The third segment (711) passes through a mid-point (707) between the first ultrasonic transducer position (703) and the second ultrasonic transducer position (705). The third segment (711) is perpendicular to a fourth segment passing through the first ultrasonic transducer position (703) and second ultrasonic transducer position (705). The first reflected wave sequentially departs from the first ultrasonic transducer position (703), reflects on the reflection point (709) and travels to the second ultrasonic transducer position (705). In this scenario, the angle of incidence θ (717) in EQ. 6 is the incident angle of the first reflected wave. Back to FIG. 6, the frequency $f_1$ in EQ. 6 is a reference frequency of the first reflected signal, defined in the same fashion as the reference frequency $f_0$ of the first source signal (605).

In one or more embodiments, the computational model (611) is based on the first propagated signal (609) and a second propagated signal (617). I in such scenarios, the second ultrasonic transducer (607) emits a second source signal (615) that radiates into the fluid as a second radiated signal, some of which is received by the first ultrasonic transducer (603) as the second propagated signal (617). Examples of a computational model (611) based on the first propagated signal (609) and the second propagated signal (617) include a transit-time difference model, defining the fluid flow rate (613) V as:

$$V = \frac{D \cdot \Delta t}{2L \cos(\theta)}. \quad \text{EQ. 7}$$

In EQ. 7, D is a diameter of the pipe, Δt is a travel time difference between the first propagated signal (609) and the second propagated signal (617) and L is a distance between the first ultrasonic transducer (603) and the second ultrasonic transducer (607). The angle θ is defined, again, as the angle of incidence θ (717) in FIG. 7. In one or more embodiments, the second propagated signal (617) includes a second reflected signal, received from a second reflected wave. The second reflected wave sequentially departs from the second ultrasonic transducer position (705), reflects on the reflection point (709) and travels to the first ultrasonic transducer position (703). A ray path of the second reflected wave is the same as the ray path of the first reflected wave, in an opposite direction. The ray path of the second reflected wave is a sequence of the reflected ray path (715) and the incident ray path (713) in FIG. 7. Due a reciprocity principle, the angle θ is the incident angle of both first reflected wave and the second reflected wave.

Back to EQ. 7 describing an embodiment of the computational model in FIG. 6, the travel time difference Δt is defined as a difference between a travel time of the first reflected signal and a travel time of the second reflected signal. The travel time difference Δt can be computed in many ways. The travel time difference Δt may be computed as an onset difference. The onset difference is defined as a difference between an onset of the first reflected wave and an onset of the second reflected wave, in accordance with one or more embodiments. The travel time difference Δt may be computed as a maximizing difference. The maximizing difference is defined as a difference between a time at which an amplitude of the first reflected signal is maximum and a time at which an amplitude of the second reflected signal is maximum, in accordance with one or more embodiments. The travel time difference Δt may be computed as a maximizing lag. The maximizing lag is defined as a lag at which a cross-correlation between the first reflected signal and the second reflected signal is maximum, in accordance with one or more embodiments. Computing Δt as a maximizing lag involves the whole first reflected signal and the whole second reflected signal. By contrast, computing Δt as an onset difference or a maximizing difference involves one point of the first reflected signal and one point of the second reflected signal. A duration of the second propagated signal (617) is the same as the duration of the first propagated signal (609), $T_{rec}$. For the computation of Δt, the time at which the second ultrasonic transducer (607) starts emitting the second source signal (615) is initialized as 0. Therefore, although the first propagated signal (609) and the second propagated signal (617) occur, in reality, at different times, they are both assumed to occur on a recording time interval $[-T_1, T_{max}+T_{prop}+T_o]$ for computation purposes.

It is noted that the first propagated signal (609) and the second propagated signal (617) may further include noise, recorded by the first ultrasonic transducer (603) and the second ultrasonic transducer (607). The noise is defined as any sonic signal that is not related to the first radiated signal or the second radiated signal. Examples of noise include current noise from the current of the fluid inside the pipe (200). Examples of noise further include any sound produced by an equipment, such as a propeller of the drone (100), or an engine of a vehicle located in a vicinity of the pipe (200). Examples of noise further include any sound related to a weather in a vicinity of the pipe (200), such as rain or thunder. In some embodiments, it is not possible to discriminate a time at which noise occurs from an onset of the first reflected wave or an onset of the second reflected wave. In some embodiments, it is not possible to discriminate a time at which noise occurs from a time at which an amplitude of the first reflected signal is maximum or a time at which an amplitude of the second reflected signal is maximum. Thus, in accordance with one or more embodiments, computing Δt as the maximizing lag is considered as less sensitive to noise than computing Δt as the onset difference or the maximizing difference. In one or more embodiments, the computational model (611) further includes pre-processing tools that attenuate noise. Examples of pre-processing tools that may attenuate noise include frequency filters, frequency-wavenumber filters, or spike detection algorithms. In some implementations, Examples of pre-processing tools that may attenuate noise make use of artificial intelligence (AI).

In one or more embodiments, the first source signal (605), the first propagated signal (609) and the second propagated signal (617) are sent to the computational model (611) as digitalized time series of amplitude samples, representing amplitudes of the first source signal (605), the first propagated signal (609) and the second propagated signal (617) at monotonically increasing discreet times. In one or more embodiments, the computational model includes both the Doppler model given in EQ. 6 and the transit-time difference model given in EQ. 7. In one or more embodiments, the computational model includes a convex combination of the Doppler model given in EQ. 6 and the transit-time difference model given in EQ. 7, defining the fluid flow rate (613) V as:

$$V = \alpha\frac{C\cdot(f_0 - f_1)}{2f_0\cos(\theta)} + (1-\alpha)\frac{D\cdot\Delta t}{2L\cos(\theta)}, \qquad \text{EQ. 8}$$

where α is a positive real number between 0 and 1. In one or more embodiments, the computational model (611) includes an extraction procedure that extracts the first reflected signal from the first propagated signal (609), or the second reflected signal from the second propagated signal (617), or both.

The first radiated signal, that radiates from the first ultrasonic transducer (603), is composed of a set of wavefronts. The first radiated signal varies in accordance with a location in space and time. Examples of variations of the first radiated signal include a spherical divergence. The amplitudes of the first source signal (605) are distributed on the wavefronts of the first radiated signal. Because acoustic energy must be preserved, amplitudes of the first radiated signal, at any point in space and time, are smaller than the source amplitudes. The amplitudes of the first radiated signal on the wavefront decrease with the distance from the wavefront to the first ultrasonic transducer (603). Examples of variations of the first radiated signal further include an acoustic absorption by the medium. The fluid absorbs some of the acoustic energy emitted by the first ultrasonic transducer (603). By doing so, the fluid constitutes a filter that reduces the amplitudes and frequencies of the first radiated signal, compared to the source amplitudes and source frequencies. Therefore, the amplitudes of the first propagated signal (609) are smaller than the source amplitudes and the frequencies of the first propagated signal (609) are smaller than the source frequencies. In a similar fashion, the amplitudes of the second propagated signal (617) signal are smaller than the source amplitudes and the frequencies of the second propagated signal (617) are smaller than the source frequencies. Therefore, acoustic absorption may interfere with computations of the fluid flow rate in EQ. 6, EQ. 7 or EQ. 8. In that regard, the computational model (611) may further include pre-processing tools that restore amplitudes and frequencies of the first propagated signal (609) and the second propagated signal (617) to the source amplitudes and the source frequencies. An example pre-processing tool that restores amplitudes reduced by the spherical divergence is a spherical divergence compensation. An example pre-processing tool that restores amplitudes and frequencies reduced by absorption by the fluid is a factor Q compensation.

Figure 8:
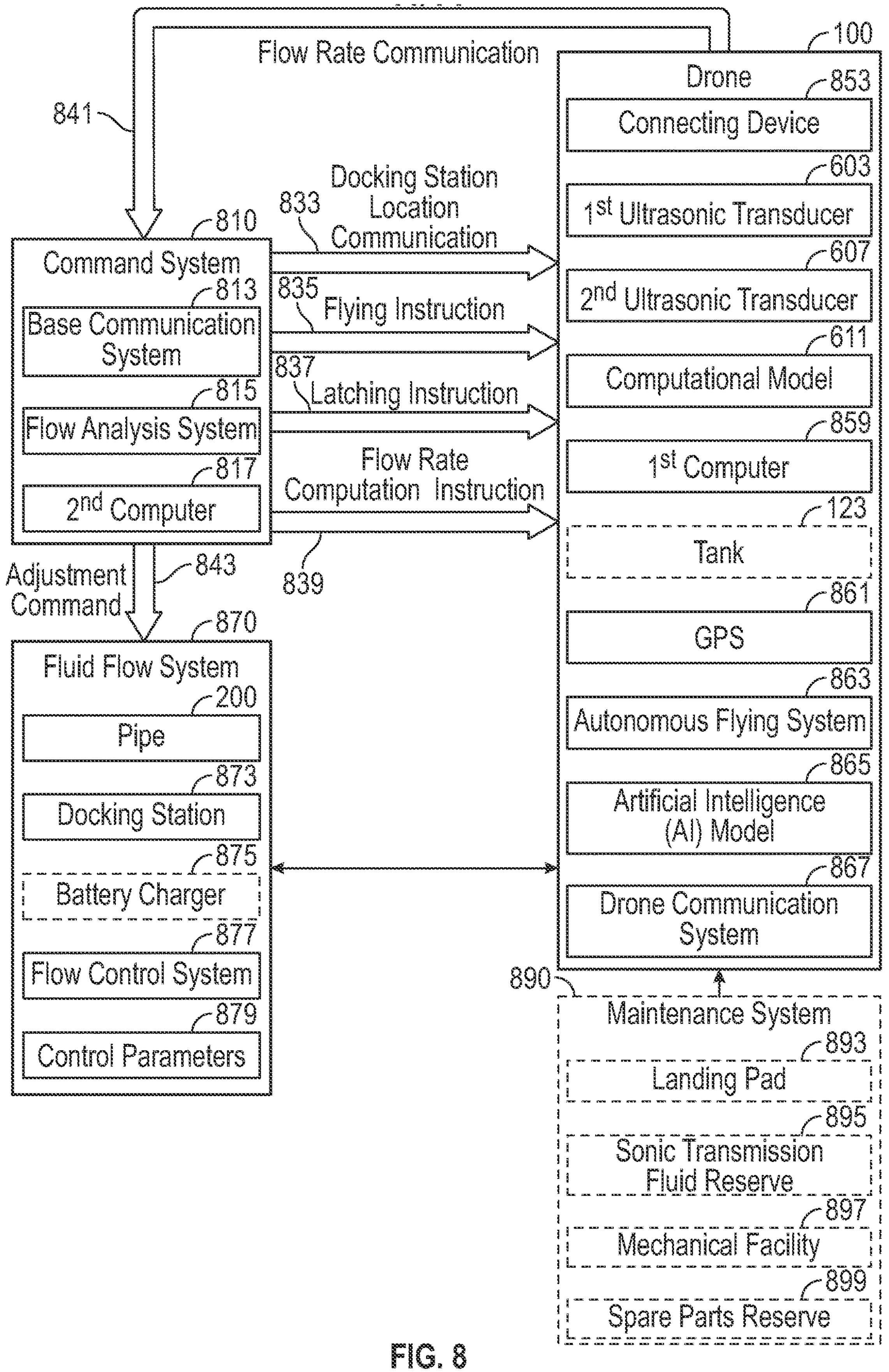
FIG. 8 depicts a system for monitoring and controlling a fluid flow through a pipe, in accordance with one or more embodiments disclosed herein.

FIG. 8 depicts a system for monitoring and controlling a fluid flow through a pipe, in accordance with one or more embodiments. FIG. 8 includes a command system (810), the drone (100), described in FIGS. 1A-1D and a fluid flow system (870). The fluid flow system (870) includes the pipe (200), described in FIGS. 2A-2C, that conveys a fluid flowing at a certain fluid flow rate. A docking station (873) is installed on the pipe (200). The fluid flow is controlled by a set of control parameters (879), which can be set or tuned using a flow control system (877). Examples of components of the control parameters (879) include, but are not limited to, an inlet pressure of the fluid at an extremity of the pipe (200), a composition of the fluid, a density of the fluid and a temperature of the fluid. The flow control system may include various devices, such a pump to apply a pressure to the fluid, a resistance to create heat into the fluid, and a remote control allowing an operator to control the pump or the resistance.

The fluid flow is controlled by control parameters (879), which can be set or tuned by a flow control system (877). Examples of components of the control parameters (879) include, but are not limited to an inlet pressure of the fluid at an extremity of the pipe (200), a composition of the fluid, a density of the fluid and a temperature of the fluid. The flow control system may include various devices, such a pump to apply a pressure to the fluid, a resistance to create heat into the fluid, and a remote control allowing an operator to control the pump or the resistance.

The drone (100) includes a connecting device (853). In one or more embodiments, the connecting device (853) comprises two connectors, such as the first connector (115) and the second connector (119) of the drone (100) in FIG. 1A-1D. In such scenarios, the docking station (873) comprises two docking ports, such as the first docking port (205) and the second docking port (207) of the docking station on the pipe (200) in FIGS. 2A-2C. The connecting device (853) is configured to latch securely onto the docking station (873), as shown in FIGS. 3A-3C. In one or more embodiments, the drone (100) includes a battery and the fluid flow system (870) further includes a battery charger (875) configured to charge the battery when the connecting device (853) is latched onto the docking stations (873). The drone (100) further includes the first ultrasonic transducer (603) and the second ultrasonic transducer (607), each of which may emit ultrasonic signal into the fluid and receive ultrasonic from the fluid when the connecting device (853) is latched onto the docking station (873). In some scenarios, the drone (100) further includes a tank (123), filled with sonic transmission fluid designed to facilitate the transmission of ultrasonic signal between the fluid and the transducers. The drone (100) further includes the computational model (611), hosted and run on a first computer (859). The first ultrasonic transducer (603), the second ultrasonic transducer (607) and computational model (611) are configured to perform a computation of the fluid flow rate of the fluid flowing through the pipe (200), as described by the system in FIG. 6. As such, in some embodiments, the computational model (611) includes the Doppler model from EQ. 6, that defines the fluid flow rate based on the first source signal (605) sent by the first ultrasonic transducer (603) and the first propagated signal (609) received by the second ultrasonic transducer (607). In some embodiments, the computational model (611) includes the transit-time model from in EQ. 7, that defines the fluid flow rate based on the first the first propagated signal (609) received by the second ultrasonic transducer (607) and the second propagated signal (617) received by the first ultrasonic transducer (603). In some embodiments, the computational model combines the Doppler model from EQ. 6 and the transit-time model from EQ. 7 into the convex combination given by EQ. 8.

In this specific implementation, the drone (100) further includes a GPS (861), an autonomous flying system (863) and an AI model (865) that is also hosted and run on the first computer (859). As described in other paragraphs of this disclosure, The GPS may be used by the autonomous flying system (863) to fly the drone (100) to a vicinity of the docking station (873). The AI model (865) may be used to detect the docking station (873) and determine a docking position for the drone (100). The docking position is suitable for the connecting device (853) to latch onto the docking station (873). In this specific implementation, the drone (100) further includes a drone communication system (867) to communicate with the command system (810).

The command system (810) includes a base communication system (813). In one or more embodiments, the base communication system (813) includes a Supervisory Control and Data Acquisition (SCADA) system. The command system (810) further includes a flow analysis system (815), that is hosted and run on a second computer (817). The flow analysis system (815) is configured to manage the fluid flow through the pipe (200) as follows. First, the flow analysis system (815) emits a request to compute the fluid flow rate at the docking station (873). The command system (810) sends a location of the docking station (873) to the drone (100), via a docking station location communication (833). The drone (100) sends a response to the command system (810) that it has received the location of the docking station (873). Then, the command system (810) sends a flying instruction (835) to the drone (100), for the drone (100) to fly to a vicinity of the docking station (873). The drone (100) sends a response to the command system (810) that it has received the flying instruction (835). The drone (100) executes the flying instruction (835) and flies autonomously to a vicinity of the docking station (873) using the autonomous flying system (863), guided by the GPS (861). The drone (100) then sends an alert to the command system that it has completed the flying instruction (835). The command system (810) instructs the drone (100) to latch the connecting device (853) securely onto the docking station (873) (ie: to land on the pipe (200)), via a latching instruction (837). The drone (100) sends a response to the command system (810) that it has received the latching instruction (837). Using the AI model (865), the drone (100) determines a docking position. Using the AI model (865) and the autonomous flying system (863), the drone (100) positions itself to the docking position. Once the drone (100) is in the docking position, the connecting device (853) latches securely onto the docking station (873), and send an alert to the command system (810) that the latching instruction (837) has been executed. The command system (810) instructs the drone (100) to compute the fluid flow rate (613) of the fluid flowing through the pipe (200), via a flow rate computation instruction (839). The drone (100) sends a response to the command system (810) that it has received the flow rate computation instruction (839). The drone (100) computes the fluid flow rate (613), using the first ultrasonic transducer (603), the second ultrasonic transducer (607) and the computational model (611), by using the system from FIG. 6. Then, the drone (100) sends the value of the fluid flow rate (613) to the command system (810), via the flow rate communication (841). It is noted that the communications between the command system (810) and the drone (100), such as the commands (833), (835), (837), (839) and (841), are done by the base communication system (813) and the drone communication system (867).

The fluid flow rate (613) is passed on to the flow analysis system (815), that determines a fluid flow performance, using the second computer (817). The fluid flow rate performance is based on the fluid flow rate (613). If the fluid flow performance is not optimum, the flow analysis system (815) determines one or more adjustments to be made to the control parameters (879) in order to optimize the fluid flow performance. Then, the flow analysis system (815) instructs the flow control system (877) to make the one or more adjustments to the control parameters (879) via an adjustment command (843). In one or more embodiments, the fluid flow performance is the fluid flow rate (613) and a determination whether the fluid flow performance is optimum is based on a pre-defined minimum flow rate threshold. If the fluid flow rate (613) is greater than or equal to the minimum flow rate threshold, the fluid flow performance is determined as optimum. By contrast, if the fluid flow rate (613) is less than the minimum flow rate threshold, the fluid flow performance is determined as not optimum. Embodiments of the system in FIG. 8 include scenarios in which the control parameters (879) include an inlet pressure of the fluid at an extremity of the pipe (200) and the fluid flow performance is determined as not optimum because the fluid flow rate (613) is less than the minimum flow rate threshold. In such scenarios, an example of an adjustment to be made to the control parameters (879) is to increase the inlet pressure as an effort to increase the fluid flow rate in the pipe (200) to a level above the minimum flow rate threshold. In one or more embodiments, the determination whether the fluid flow performance is optimum is based on a pre-defined maximum flow rate threshold. If the fluid flow rate (613) is less than or equal to the maximum flow rate threshold, the fluid flow performance is determined as optimum. By contrast, if the fluid flow rate (613) is greater than the maximum flow rate threshold, the fluid flow performance is determined as not optimum. Embodiments of the system in FIG. 8 include scenarios in which the control parameters (879) include an inlet pressure of the fluid at an extremity of the pipe (200) and the fluid flow performance is determined as not optimum because the fluid flow rate (613) is greater than the maximum flow rate threshold. In such scenarios, an example of an adjustment to be made to the control parameters (879) is to decrease the inlet pressure as an effort to decrease the fluid flow rate in the pipe (200) to a level below the maximum flow rate threshold. After the adjustments to the control parameters have been made, the flow analysis system (815) may emit another request to compute the fluid flow rate at the docking station (873), in order to check whether the fluid flow performance has become optimum.

In one or more embodiments, the system in FIG. 8 further includes a maintenance system (890). The maintenance system (890) is in charge of installing the docking station (873) on the pipe (200) and performing maintenance activities on the drone (100). The maintenance system (890) may include a landing pad (893) for the drone (100) to land in order to undergo maintenance. Examples of maintenance activities that may be performed by the maintenance system (890) on the drone (100) include re-filling the tank (123) with sonic transmission fluid, taken from a sonic transmission fluid reserve (895). Examples of maintenance activities that may be performed by the maintenance system (890) on the drone (100) further include a repair, made in a mechanical facility (897), and changing a part of the drone by installing a spare part taken from a spare part reserve (899).

As stated, an execution of the system in FIG. 8 starts with the flow analysis system (815) emitting a request to compute the fluid flow rate at the docking station (873). Such a request may have several origins. In some scenarios, the request may come from an operator of the command system (810). The operator of the command system (810) may be a human or a machine. In other scenarios, the request is automated. For instance, a request to compute the fluid flow rate at the docking station (873) may be sent at regular intervals in order to monitor the fluid flow performance continuously.

The system in FIG. 8 is described using the drone (100) and pipe (200) as examples. It is emphasized that the drone and pipe used in the system in FIG. 8 may take different forms without departing from the scope of this disclosure, provided that the drone is configured to land on the pipe and compute a fluid flow rate of the fluid flowing through the pipe. Another embodiment for the drone and the pipe are given by the drone (400) and the pipe (500) described in FIGS. 4A-5B, but should not be considered as limiting the scope of this disclosure. Furthermore, the system in FIG. 8 is described as comprising one drone (ie: the drone (100)) and one pipe (ie: the pipe (200)). One with ordinary skill in the art will recognize that the system in FIG. 8 naturally extends to a system with multiple drones, multiple pipes, and multiple docking stations. The multiple drones may receive locations of multiple docking stations, execute multiple flying instructions, latching instructions, flow rate computation instructions, and send the results of the multiple flow rate computations to the command system (810). The flow analysis system (815) may analyze the multiple flow rate computations and adjust control parameters to optimize a fluid flow performance through the multiple pipes. When a drone has finished computing a fluid flow rate at a docking station on a given pipe, it may receive new flying instruction, latching instruction, and flow rate computation instruction to fly and measure the fluid flow rate at another docking station, possibly located on another pipe. The maintenance system (890) may be used as a centralized maintenance system to perform maintenance operations on the multiple drones.

Figure 9:
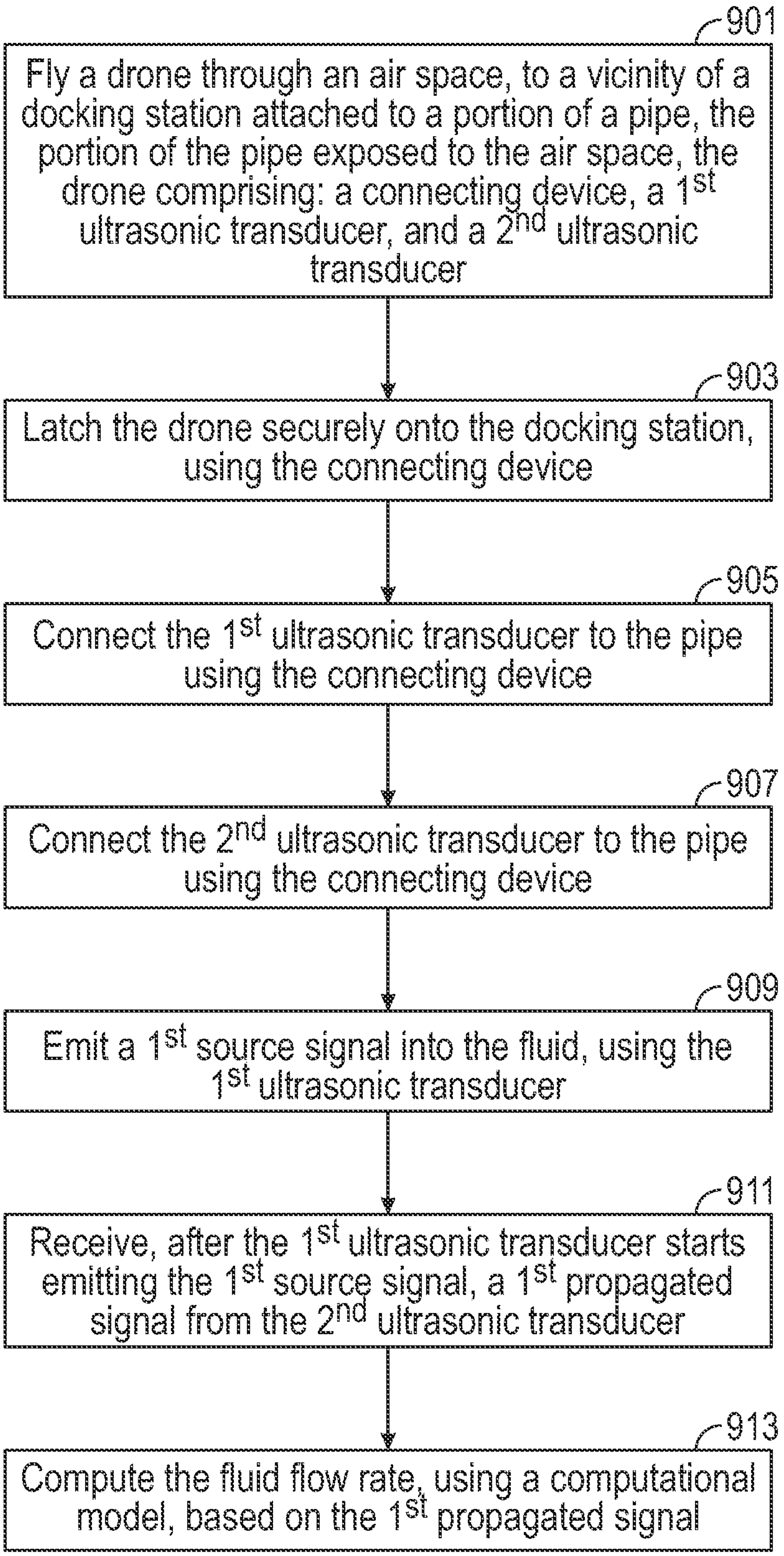
FIG. 9 depicts a method for computing a fluid flow rate of a fluid flowing through a pipe, in accordance with one or more embodiments disclosed herein.

FIG. 9 depicts a method for computing a fluid flow rate of a fluid flowing through a pipe, using a drone. In Step 901, a drone is flown, through an air space, to a vicinity of a docking station attached to a portion of a pipe. The portion of the pipe and the docking station are exposed to the air space. The drone comprises a connecting device, a first ultrasonic transducer and a second ultrasonic transducer. A notable example of the drone in FIG. 9 is the drone (100) from FIG. 1A-1D, comprising the connecting device (853), the first ultrasonic transducer (603) and the second ultrasonic transducer (607). In the drone (100), the connecting device (853) comprises the first connector (115) in which the first ultrasonic transducer (603) is installed, and the second connector (119), in which in and the second ultrasonic transducer (607) is installed. Both ultrasonic transducers are able to emit and receive ultrasonic signal from an external medium. A notable example of the pipe in FIG. 9 is the pipe (200) from FIG. 2A-2C, in which the docking station (873) comprises a first connector (115) and a second connector (119).

In Step 903, the drone is securely latched onto the docking station using the connecting device. An example of latching the drone to the docking station is given in FIGS. 3A-3C, in which the first connector (115) latches onto the first docking port (205) and the second connector (119) latches onto the second docking port (207). While the drone is securely latched onto the docking station, the first ultrasonic transducer and second ultrasonic transducer are connected to the pipe in Steps 905 and 907. In one or more embodiments, the term "connected to the pipe" means "put in contact with the pipe." In other embodiments, a connecting mechanism is used to connect the and first ultrasonic transducer and second ultrasonic transducer (607) to the pipe, such as a plug.

In Step 909, the first ultrasonic transducer emits a first source signal into the fluid. As stated in another paragraph of this disclosure, the first source signal, such as the first source signal (605) in FIG. 6, has a duration in time (ie: is not instantaneous) and may include frequencies above a range of audible frequencies by a human ear, making the first source signal ultrasonic. After the first ultrasonic transducer starts emitting the first source signal, the second ultrasonic transducer receives a first propagated signal from the fluid in Step 911. Generally, the goal of Step 911 is to receive the portion of a signal that radiates from the first source signal in Step 909 and travels to the second transducer. Hence, as described in the description of FIG. 6, the first propagated signal includes a portion of a signal radiated from the first source signal. In some embodiments, the first propagated signal further includes noise. An example for the first propagated signal in Step 911 is given by the first propagated signal (609) in FIG. 6.

In Step 913, a fluid flow rate is computed by using a computational model, based on, at least, the first propagated signal from Step 911. An example for the computational model in Step 913 is the computational model (611) in FIG. 6. As described in the description of FIG. 6, the computational model may be of various types. In one or more embodiments, the computational model in Step 913 includes a Doppler model, such as the Doppler model in EQ. 6. In this case, computing the fluid flow rate in Step 913 is further based on the first source signal from Step 909. In one or more embodiments, the computational model in Step 913 includes a transit-time model, such as the transit-time model in EQ. 7. In this case, a second propagated signal is needed. The second transducer emits a second source signal, such as the second source signal (615) in FIG. 6, and, after the second transducer starts emitting the second source signal, a second propagated signal is received by the first transducer, capturing signal radiated from the second source signal.

As stated, a docking position, suitable for a drone to latch onto a docking station, is determined using an AI model, such as the AI model (865) in FIG. 8. The AI model may further be used to help an autonomous flying system of the drone, such as the autonomous flying system (863), positioning the drone to the docking position. Artificial intelligence (AI), broadly defined, is the extraction of patterns and insights from data. The phrases "artificial intelligence," "machine learning," "deep learning," and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term artificial intelligence will be adopted herein, however, one skilled in the art will recognize that the concepts and methods detailed hereafter are not limited by this choice of nomenclature.

AI model types may include, but are not limited to, generalized linear models, Bayesian regression, random forests, and deep models such as neural networks, convolutional neural networks, and recurrent neural networks. AI model types, whether they are considered deep or not, are usually associated with additional "hyperparameters" which further describe the model. For example, hyperparameters providing further detail about a neural network may include, but are not limited to, the number of layers in the neural network, choice of activation functions, inclusion of batch normalization layers, and regularization strength. Commonly, in the literature, the selection of hyperparameters surrounding an AI model is referred to as selecting the model "architecture." Once an AI model type and hyperparameters have been selected, the AI model is trained to perform a task.

A notable example of an AI model that may be used as AI model (865) is a neural network (NN), such as a convolutional neural network (CNN). A cursory introduction to a NN is provided herein. However, it is noted that many variations of a NN exist. Therefore, one with ordinary skill in the art will recognize that any variation of the NN (or any other AI model) may be employed without departing from the scope of this disclosure. Further, it is emphasized that the following discussions of a NN is a basic summary and should not be considered limiting.

Figure 10:
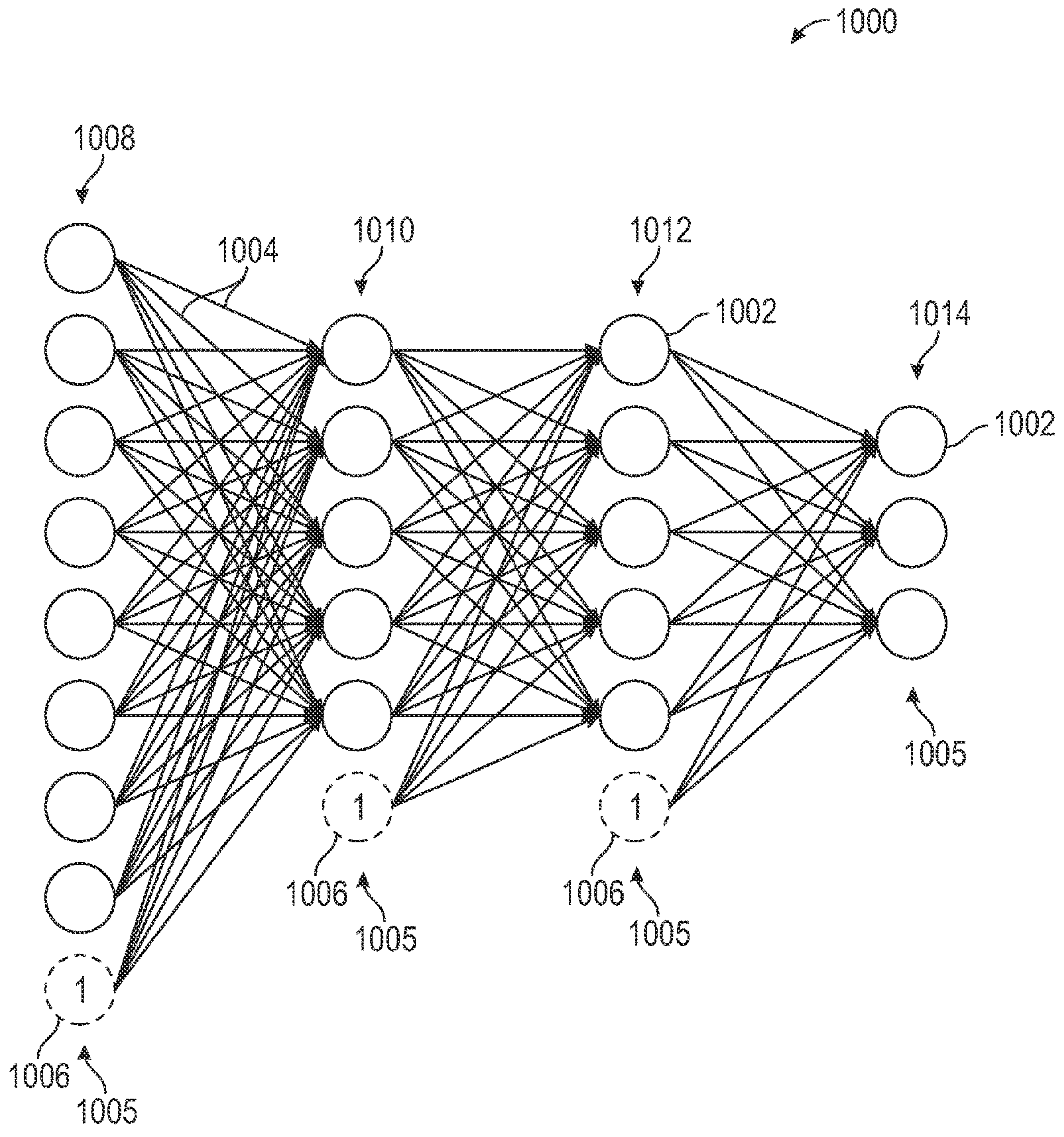
FIG. 10 depicts an example diagram of a neural network, in accordance with one or more embodiments disclosed herein.

A diagram of a neural network is shown in FIG. 10. At a high level, a neural network (1000) may be graphically depicted as being composed of nodes (1002), where here any circle represents a node, and edges (1004), shown here as directed lines. The nodes (1002) may be grouped to form layers (1005). FIG. 10 displays four layers (1008, 1010, 1012, 1014) of nodes (1002) where the nodes (1002) are grouped into columns, however, the grouping need not be as shown in FIG. 10. The edges (1004) connect the nodes (1002). Edges (1004) may connect, or not connect, to any node(s) (1002) regardless of which layer (1005) the node(s) (1002) is in. That is, the nodes (1002) may be sparsely and residually connected. A neural network (1000) will have at least two layers (1005), where the first layer (1008) is considered the "input layer" and the last layer (1014) is the "output layer." Any intermediate layer (1010, 1012) is usually described as a "hidden layer." A neural network (1000) may have zero or more hidden layers (1010, 1012) and a neural network (1000) with at least one hidden layer (1010, 1012) may be described as a "deep" neural network or as a "deep learning method." In general, a neural network (1000) may have more than one node (1002) in the output layer (1014). In this case the neural network (1000) may be referred to as a "multi-target" or "multi-output" network.

Nodes (1002) and edges (1004) carry additional associations. Namely, every edge is associated with a numerical value. The edge numerical values, or even the edges (1004) themselves, are often referred to as "weights" or "parameters." While training a neural network (1000), numerical values are assigned to each edge (1004). Additionally, every node (1002) is associated with a numerical variable and an activation function. Activation functions are not limited to any functional class, but traditionally follow the form $$A = f\left(\sum_{i\in(incoming)}[(\text{node value})_i(\text{edge value})_i]\right), \quad \text{EQ. 9}$$

where i is an index that spans the set of "incoming" nodes (1002) and edges (1004) and f is a user-defined function. Incoming nodes (1002) are those that, when the neural network (1000) is viewed or depicted as a directed graph (as in FIG. 10), have directed arrows that point to the node (1002) where the numerical value is being computed. Some functions for $f$ may include the linear function $f(x)=x$, sigmoid function $$f(x) = \frac{1}{1+e^{-x}},$$

and rectified linear unit function $f(x)=\max(0, x)$, however, many additional functions are commonly employed. Every node (1002) in a neural network (1000) may have a different associated activation function. Often, as a shorthand, activation functions are described by the function $f$ by which it is composed. That is, an activation function composed of a linear function $f$ may simply be referred to as a linear activation function without undue ambiguity.

When the neural network (1000) receives an input, the input is propagated through the network according to the activation functions and incoming node (1002) values and edge (1004) values to compute a value for each node (1002). That is, the numerical value for each node (1002) may change for each received input. Occasionally, nodes (1002) are assigned fixed numerical values, such as the value of 1, that are not affected by the input or altered according to edge (1004) values and activation functions. Fixed nodes (1002) are often referred to as "biases" or "bias nodes" (1006), displayed in FIG. 10 with a dashed circle.

In some implementations, the neural network (1000) may contain specialized layers (1005), such as a normalization layer, or additional connection procedures, like concatenation. One skilled in the art will appreciate that these alterations do not exceed the scope of this disclosure.

As noted, the training procedure for the neural network (1000) comprises assigning values to the edges (1004). To begin training the edges (1004) are assigned initial values. These values may be assigned randomly, assigned according to a prescribed distribution, assigned manually, or by some other assignment mechanism. Once edge (1004) values have been initialized, the neural network (1000) may act as a function, such that it may receive inputs and produce an output. As such, at least one input is propagated through the neural network (1000) to produce an output. Training data is provided to the neural network (1000). Generally, training data consists of pairs of inputs and associated targets. The targets represent the "ground truth," or the otherwise desired output, upon processing the inputs. In the context where the AI model in this disclosure is an image detection model, an example input may be a candidate image comprising an image of a docking station. An associated output, or target, may be a box within the candidate image, the box containing the image of the docking station. Another example input may be a candidate image that does not include an image of a docking station. A corresponding output, or target, may be a flag alerting that there is no image of a docking station in the candidate image. In the context where the AI model is a segmentation model, an example input may be a candidate image. An associated output, or target, may include a mask of a same size as the candidate image, each pixel of the mask having a value of zero or one. The mask may have a value of one if the pixel is detected as being part of an image of a docking station, or a value of zero if the pixel is detected as not being part of an image of a docking station. During training, the neural network (1000) processes at least one input from the training data and produces at least one output. Each neural network (1000) output is compared to its associated input data target. The comparison of the neural network (1000) output to the target is typically performed by a so-called "loss function;" although other names for this comparison function such as "error function," "misfit function," and "cost function" are commonly employed. Many types of loss functions are available, such as the mean-squared-error function, however, the general characteristic of a loss function is that the loss function provides a numerical evaluation of the similarity between the neural network (1000) output and the associated target. The loss function may also be constructed to impose additional constraints on the values assumed by the edges (1004), for example, by adding a penalty term, which may be physics-based, or a regularization term. Generally, the goal of a training procedure is to alter the edge (1004) values to promote similarity between the neural network (1000) output and associated target over the training data. Thus, the loss function is used to guide changes made to the edge (1004) values, typically through a process called "backpropagation."

While a full review of the backpropagation process exceeds the scope of this disclosure, a brief summary is provided. Backpropagation consists of computing the gradient of the loss function over the edge (1004) values. The gradient indicates the direction of change in the edge (1004) values that results in the greatest change to the loss function. Because the gradient is local to the current edge (1004) values, the edge (1004) values are typically updated by a "step" in the direction indicated by the gradient. The step size is often referred to as the "learning rate" and need not remain fixed during the training process. Additionally, the step size and direction may be informed by previously seen edge (1004) values or previously computed gradients. Such methods for determining the step direction are usually referred to as "momentum" based methods.

Once the edge (1004) values have been updated, or altered from their initial values, through a backpropagation step, the neural network (1000) will likely produce different outputs. Thus, the procedure of propagating at least one input through the neural network (1000), comparing the neural network (1000) output with the associated target with a loss function, computing the gradient of the loss function with respect to the edge (1004) values, and updating the edge (1004) values with a step guided by the gradient, is repeated until a termination criterion is reached. Common termination criteria are: reaching a fixed number of edge (1004) updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge (1004) values are no longer intended to be altered, the neural network (1000) is said to be "trained."

With respect to a CNN, it is useful to consider a structural grouping, or group, of weights. Such a group is herein referred to as a "filter." The number of weights in a filter is typically much less than the number of inputs. In a CNN, the filters can be thought as "sliding" over, or convolving with, the inputs to form an intermediate output or intermediate representation of the inputs which still possesses a structural relationship. Like unto the neural network (1000), the intermediate outputs are often further processed with an activation function. Many filters may be applied to the inputs to form many intermediate representations. Additional filters may be formed to operate on the intermediate representations creating more intermediate representations. This process may be repeated as prescribed by a user. There is a "final" group of intermediate representations, wherein no more filters act on these intermediate representations. In some instances, the structural relationship of the final intermediate representations is ablated; a process known as "flattening." The flattened representation may be passed to a neural network (1000) to produce a final output. Note, that in this context, the neural network (1000) is still considered part of the CNN. Like unto a neural network (1000), a CNN is trained, after initialization of the filter weights, and the edge (1004) values of the internal neural network (1000), if present, with the backpropagation process in accordance with a loss function.

Figure 11:
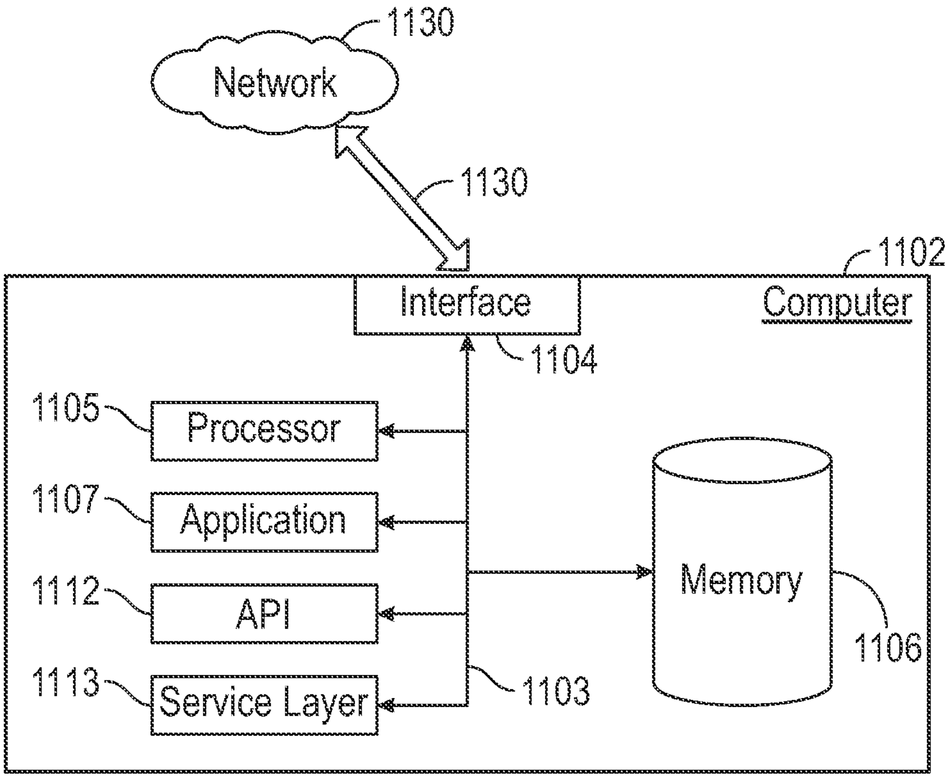
FIG. 11 an example diagram of a computer, in accordance with one or more embodiments disclosed herein.

The computations mentioned in this disclosure, or the commands performed by the autonomous flying system (863) may be performed by a computer, such as the first computer (859) in FIG. 8. In that regard, FIG. 11 depicts a block diagram of a computer (1102) used to provide computational functionalities associated with described algorithms, methods, functions, processes, flows, and procedures as described in this disclosure, according to one or more embodiments. The illustrated computer (1102) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (1102) may include a computer that includes an input device, such as a keypad, keyboard, touch screen, or other device that can accept user information, and an output device that conveys information associated with the operation of the computer (1102), including digital data, visual, or audio information (or a combination of information), or a GUI.

The computer (1102) can serve in a role as a client, network component, a server, a database or other persistency, or any other component (or a combination of roles) of a computer system for performing the subject matter described in the instant disclosure. In some implementations, one or more components of the computer (1102) may be configured to operate within environments, including cloud-computing-based, local, global, or other environments (or a combination of environments).

At a high level, the computer (1102) is an electronic computing device operable to receive, transmit, process, store, or manage data and information associated with the described subject matter. According to some implementations, the computer (1102) may also include or be communicably coupled with an application server, e-mail server, web server, caching server, streaming data server, business intelligence (BI) server, or other server (or a combination of servers).

The computer (1102) can receive requests over network (1130) from a client application (for example, executing on another computer (1102) and responding to the received requests by processing the said requests in an appropriate software application. In addition, requests may also be sent to the computer (1102) from internal users (for example, from a command console or by other appropriate access method), external or third-parties, other automated applications, as well as any other appropriate entities, individuals, systems, or computers.

Each of the components of the computer (1102) can communicate using a system bus (1103). In some implementations, any or all of the components of the computer (1102), both hardware or software (or a combination of hardware and software), may interface with each other or the interface (1104) (or a combination of both) over the system bus (1103) using an application programming interface (API) (1112) or a service layer (1113) (or a combination of the API (1112) and service layer (1113). The API (1112) may include specifications for routines, data structures, and object classes. The API (1112) may be either computer-language independent or dependent and refer to a complete interface, a single function, or even a set of APIs. The service layer (1113) provides software services to the computer (1102) or other components (whether or not illustrated) that are communicably coupled to the computer (1102). The functionality of the computer (1102) may be accessible for all service consumers using this service layer. Software services, such as those provided by the service layer (1113), provide reusable, defined business functionalities through a defined interface. For example, the interface may be software written in JAVA, C++, or other suitable language providing data in extensible markup language (XML) format or another suitable format. While illustrated as an integrated component of the computer (1102), alternative implementations may illustrate the API (1112) or the service layer (1113) as stand-alone components in relation to other components of the computer (1102) or other components (whether or not illustrated) that are communicably coupled to the computer (1102). Moreover, any or all parts of the API (1112) or the service layer (1113) may be implemented as child or sub-modules of another software module, enterprise application, or hardware module without departing from the scope of this disclosure.

The computer (1102) includes an interface (1104). Although illustrated as a single interface (1104) in FIG. 11, two or more interfaces (1104) may be used according to particular needs, desires, or particular implementations of the computer (1102). The interface (1104) is used by the computer (1102) for communicating with other systems in a distributed environment that are connected to the network (1130). Generally, the interface (1104) includes logic encoded in software or hardware (or a combination of software and hardware) and operable to communicate with the network (1130). More specifically, the interface (1104) may include software supporting one or more communication protocols associated with communications such that the network (1130) or interface's hardware is operable to communicate physical signals within and outside of the illustrated computer (1102).

The computer (1102) includes at least one computer processor (1105). Although illustrated as a single computer processor (1105) in FIG. 11, two or more processors may be used according to particular needs, desires, or particular implementations of the computer (1102). Generally, the computer processor (1105) executes instructions and manipulates data to perform the operations of the computer (1102) and any algorithms, methods, functions, processes, flows, and procedures as described in the instant disclosure.

The computer (1102) also includes a memory (1106) that holds data for the computer (1102) or other components (or a combination of both) that can be connected to the network (1130). The memory may be a non-transitory computer readable medium. For example, memory (1106) can be a database storing data consistent with this disclosure. Although illustrated as a single memory (1106) in FIG. 11, two or more memories may be used according to particular needs, desires, or particular implementations of the computer (1102) and the described functionality. While memory (1106) is illustrated as an integral component of the computer (1102), in alternative implementations, memory (1106) can be external to the computer (1102).

The application (1107) is an algorithmic software engine providing functionality according to particular needs, desires, or particular implementations of the computer (1102), particularly with respect to functionality described in this disclosure. For example, application (1107) can serve as one or more components, modules, applications, etc. Further, although illustrated as a single application (1107), the application (1107) may be implemented as multiple applications (1107) on the computer (1102). In addition, although illustrated as integral to the computer (1102), in alternative implementations, the application (1107) can be external to the computer (1102).

There may be any number of computers such as the computer (1102) associated with, or external to, a computer system containing computer (1102), wherein each computer (1102) communicates over network (1130). Further, the term "client," "user," and other appropriate terminology may be used interchangeably as appropriate without departing from the scope of this disclosure. Moreover, this disclosure contemplates that many users may use one computer (1102), or that one user may use multiple computers such as the computer (1102).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A system comprising:
- a flow control system configured to set control parameters controlling a fluid flow of a fluid flowing in a pipe according to a fluid flow rate, the control parameters comprising an inlet pressure of the fluid at an extremity of the pipe;
- a docking station, attached to a portion of the pipe, the portion of the pipe exposed to an air space;
- a drone capable of flying through the air space to the docking station, the drone comprising:
  - a connecting device configured to latch securely onto the docking station,
  - a first ultrasonic transducer that connects to the pipe when the connecting device is latched,
  - a second ultrasonic transducer that connects to the pipe when the connecting device is latched, and
  - a computer, configured to perform a computational procedure, comprising:
    - instructing the first ultrasonic transducer to emit a source signal into the fluid;
    - receiving, after the first ultrasonic transducer starts emitting the source signal, a propagated signal from the second ultrasonic transducer; and
    - computing the fluid flow rate, using a computational model, based on the propagated signal; and
- a command system configured to:
  - make a determination whether the fluid flow rate is within a pre-defined range; and
  - in response to the determination that the fluid flow rate is outside the pre-defined range:
    - determine adjustments to be made to the control parameters to bring the fluid flow rate to a level within the pre-defined range, the adjustments comprising an increase or decrease of the inlet pressure; and send a command for the flow control system to make the adjustments to the control parameters.

2. The system of claim 1, wherein the computational model comprises one or more of:
a transit-time difference method; and
a Doppler method.

3. The system of claim 1, wherein:
the docking station comprises:
a first docking port, and
a second docking port;
the drone further comprises:
a first arm, and
a second arm;
the connecting device comprises:
a first connector, installed at a distal end of the first arm, the first connector configured to latch securely onto the first docking port, and
a second connector, installed at a distal end of the second arm, the first-second connector configured to latch securely onto the second docking port;
the first ultrasonic transducer is installed in the first connector; and
the second ultrasonic transducer is installed in the second connector.

4. The system of claim 1, wherein the drone further comprises:
a tank containing a sonic transmission fluid, the tank connected to the first ultrasonic transducer and the second ultrasonic transducer; and
a release mechanism configured to release sonic transmission fluid from the tank to the first ultrasonic transducer and the second ultrasonic transducer.

5. The system of claim 1, wherein:
the drone further comprises:
an electrical motor that provides lift and thrust to the drone, and
a battery that provides electrical power to the motor;
the docking station further comprises a battery charger; and
the connecting device, when latched, connects the battery to the battery charger in order to charge the battery.

6. The system of claim 1, wherein:
the drone further comprises:
a global positioning system (GPS), configured to receive a location of the docking station, and
an autonomous flying system configured to fly the drone to a vicinity of the docking station, guided by the GPS; and
the computer is further configured to perform a latching procedure, comprising:
determining, using an artificial intelligence (AI) model, a docking position in which the connecting device can latch to the docking station,
sending a flying command to the autonomous flying system to fly the drone into the docking position, and
sending a latching command to the connecting device to latch securely onto the docking station.

7. The system of claim 1,
wherein the command system is further configured to:
instruct the drone to fly to the vicinity of the docking station,
send a latching command for the connecting device to latch securely onto the docking station; and
instruct the computer to perform the computational procedure at the docking station.

8. The system of claim 7, wherein the command system comprises a supervisory control and data acquisition (SCADA) system, configured to receive the fluid flow rate.

9. The system of claim 4, further comprising:
a landing pad for the drone; and
a mechanical facility, configured to:
install the docking station to the pipe,
load the first ultrasonic transducer and the second ultrasonic transducer to the drone,
fill the tank with the sonic transmission fluid, and
perform a maintenance on the drone.

10. The system of claim 7, further comprising an additional docking station attached to another portion of the pipe, the other portion of the pipe exposed to the air space, wherein the command system is further configured to:
instruct the drone to fly from the docking station to the additional docking station;
send an additional latching command for the connecting device to latch securely onto the additional docking station; and
instruct the computer to perform the computational procedure at the additional docking station.

11. The system of claim 10, wherein the command system is further configured to:
instruct the drone to return from the additional docking station to the docking station;
repeat the latching command;
instruct the computer to repeat the computational procedure at the docking station; and
verify whether the fluid flow rate is within the pre-defined range.

12. A method comprising:
setting control parameters controlling a fluid flow of a fluid flowing in a pipe according to a fluid flow rate, the control parameters comprising an inlet pressure of the fluid at an extremity of the pipe;
flying a drone through an air space, to a docking station attached to a portion of the pipe, the portion of the pipe exposed to the air space, the drone comprising:
a connecting device,
a first ultrasonic transducer, and
a second ultrasonic transducer;
latching the connecting device securely onto the docking station;
connecting the first ultrasonic transducer to the pipe using the connecting device;
connecting the second ultrasonic transducer to the pipe using the connecting device;
performing a computational procedure at the docking station, the computational procedure comprising:
emitting a source signal into the fluid, using the first ultrasonic transducer;
receiving, after the first ultrasonic transducer starts emitting the source signal, a propagated signal from the second ultrasonic transducer, and
computing the fluid flow rate, using a computational model, based on the propagated signal;
making a determination whether the fluid flow rate is within a pre-defined range; and
in response to the determination that the fluid flow rate is outside the pre-defined range:
determining adjustments to be made to the control parameters to bring the fluid flow rate to a level within the pre-defined range, the adjustments comprising an increase or decrease of the inlet pressure; and
making the adjustments to the control parameters.

13. The method of claim 12, wherein the computational model comprises one or more of:

a transit-time difference method; and a Doppler method.

14. The method of claim 12, wherein:

the docking station comprises:

a first docking port, and a second docking port;

the drone further comprises:

a first arm, and a second arm;

the connecting device comprises:

a first connector, installed at a distal end of the first arm, and a second connector, installed at a distal end of the second arm;

the first ultrasonic transducer is installed in the first connector;

the second ultrasonic transducer is installed in the second connector; and latching the connecting device securely onto the docking station comprises:

latching the first connector securely onto the first docking port, and latching the second connector securely onto the second docking port.

15. The method of claim 12:

wherein the drone further comprises a tank containing a sonic transmission fluid, the tank connected to the first ultrasonic transducer and the second ultrasonic transducer; and further comprising releasing sonic transmission fluid from the tank to the first ultrasonic transducer and the second ultrasonic transducer.

16. The method of claim 12:

wherein:

the drone further comprises:

an electrical motor that provides lift and thrust to the drone, and a battery that provides electrical power to the motor, and the docking station further comprises a battery charger, the method further comprising charging the battery with the battery charger.

17. The method of claim 12, wherein flying the drone to the docking station comprises:

sending a location of the docking station to the drone;

flying the drone autonomously to a vicinity of the docking station using a global positioning system;

determining, using an artificial intelligence (AI) model, a docking position in which the connecting device can latch to the docking station; and positioning the drone into the docking position.

18. The method of claim 15, further comprising:

installing the docking station on the pipe;

loading the first ultrasonic transducer and the second ultrasonic transducer to the drone;

filling the tank with sonic transmission fluid; and performing maintenance on the drone.

19. The method of claim 12, further comprising:

flying the drone from the docking station to an additional docking station attached to another portion of the pipe, the other portion of the pipe exposed to the air space;

latching the connecting device securely onto the additional docking station; and performing the computational procedure at the additional docking station.

20. The method of claim 19, further comprising:

flying the drone to return from the additional docking station to the docking station;

repeating latching the connecting device securely onto the docking station;

repeating the computational procedure at the docking station; and verifying whether the fluid flow rate is within the predefined range.

* * * * *